US008630935B1

(12) United States Patent
Fonss

(10) Patent No.: US 8,630,935 B1
(45) Date of Patent: Jan. 14, 2014

(54) SYSTEM AND METHOD FOR THE CREATION AND REBALANCING OF BENEFICIAL INTERESTS IN TRACKING INVESTMENT VEHICLES OVER MULTIPLE MARKET

(76) Inventor: Jack Fonss, New Canaan, CT (US)

( * ) Notice: Subject to any disclaimer, the term of this patent is extended or adjusted under 35 U.S.C. 154(b) by 0 days.

(21) Appl. No.: 13/350,012

(22) Filed: Jan. 13, 2012

Related U.S. Application Data

(60) Provisional application No. 61/501,231, filed on Jun. 26, 2011, provisional application No. 61/515,310, filed on Aug. 4, 2011, provisional application No. 61/535,644, filed on Sep. 16, 2011, provisional application No. 61/547,393, filed on Oct. 14, 2011.

(51) Int. Cl.
*G06Q 40/00* (2012.01)

(52) U.S. Cl.
USPC ........................................... 705/36 R

(58) Field of Classification Search
USPC ........................................... 705/36 R
See application file for complete search history.

(56) References Cited

U.S. PATENT DOCUMENTS

| | | | |
|---|---|---|---|
| 5,987,435 A | 11/1999 | Weiss et al. | |
| 6,513,020 B1 | 1/2003 | Weiss et al. | |
| 2008/0046292 A1* | 2/2008 | Myers et al. | 705/3 |
| 2011/0087679 A1* | 4/2011 | Rosato et al. | 707/749 |
| 2011/0191234 A1 | 8/2011 | Kiron | |
| 2011/0289017 A1* | 11/2011 | Renshaw | 705/36 R |
| 2012/0078773 A1 | 3/2012 | Seale et al. | |
| 2012/0078774 A1 | 3/2012 | Seale et al. | |
| 2012/0150767 A1 | 6/2012 | Chacko et al. | |
| 2012/0166326 A1* | 6/2012 | Sapir et al. | 705/37 |

OTHER PUBLICATIONS

U.S. Appl. No. 61/501,231, filed Jun. 26, 2011, entitled "System and Method for the Creation and Rebalancing of Beneficial Interests in Index Tracking Investment Vehicles Over Multiple Market Periods" (87 pages).
U.S. Appl. No. 61/515,310, filed Aug. 4, 2011, entitled "System and Method for the Creation and Rebalancing of Beneficial Interests in Index Tracking Investment Vehicles Over Multiple Market Periods" (117 pages).
U.S. Appl. No. 61/535,644, filed Sep. 16, 2011, entitled "System and Method for the Creation and Rebalancing of Beneficial Interests in Index Tracking Investment Vehicles Over Multiple Market Periods" (135 pages).
U.S. Appl. No. 61/547,393, filed Oct. 14, 2011, entitled "System and Method for the Creation and Rebalancing of Beneficial Interests in Index Tracking Investment Vehicles Over Multiple Market Periods" (154 pages).

(Continued)

*Primary Examiner* — Lindsay M. Maguire
(74) *Attorney, Agent, or Firm* — McCarter & English, LLP

(57) ABSTRACT

A computer implemented process and system is disclosed that relates to methods and systems for creating, tracking, and adjusting beneficial interests of collective investment vehicles on a real-time basis based on exogenous market price movement and transaction activity on the beneficial interests. The disclosed technology encompasses systems and methods of communication with securities exchanges, market makers, brokerage firms, custodians, investors, and the administrator of the investment vehicle. Such communications enable the market value of the interests to accurately track an underlying reference index, over time horizons equal to or longer than one trading day. Such accurate tracking occurs even in a collective investment vehicle relating to leveraged or inverse returns.

4 Claims, 23 Drawing Sheets

(56) References Cited

OTHER PUBLICATIONS

U.S. Appl. No. 61/611,267, filed Mar. 15, 2012, entitled "A Processing System for Creating and Transforming Two Claims of a Single Issuer Entity at System Determined Intervals Based on a Variable or Index" (21 pages).

U.S. Appl. No. 61/622,179, filed Apr. 10, 2012, entitled "Processing System for Creating, Monitoring and Transforming Multiple Interests of One or More Issuer Entities at System Determined Intervals Based on a Variable or Index" (32 pages).

Co-Pending U.S. Appl. No. 13/767,622, filed Feb. 14, 2013, entitled "A System and Process for Creating, Monitoring and Transforming Multiple Interests of One or More Issuer Entities at System Determined Intervals Based on a Variable or Index" (89 pages).

Co-Pending U.S. Appl. No. 13/619,643, filed Sep. 14, 2012, entitled "System and Method for the Creation and Rebalancing of Beneficial Interests in Index Tracking and Other Investment Vehicles Over Multiple Market Periods Using Fixed or Regularly Resetting Prices to Calibrate Outstanding Interest Counts with Liquidation Entitlements" (68 pages).

Office Action mailed on Jan. 17, 2013, issued in connection with Co-Pending U.S. Appl. No. 13/619,643 (15 pages).

U.S. Securities and Exchange Commission website, Leveraged and Inverse ETFs: Specialized Products with Extra Risks for Buy-and-Hold in, pp. 1-4, http://www.sec.gov/investor/pubs/leveragedetfs-alert.htm (4 pages).

ProFunds Group, ProFunds Group Investor Education Series, "The Universal Effects of Compounding and Leveraged Funds", vol. 1, Spring 2009, pp. 1-2 http://www.profunds.com/media/pdf/publications/CompVol1072809.pdf (2 pages).

\* cited by examiner

FIG. 1

OIL - BRENT

| 3 Day | | | 10 Day | |
|---|---|---|---|---|
| Date | Ret% | | Date | Ret% |
| 5-Dec-2008 | -16.8% | | 9-Nov-2001 | 5.9% |
| 8-Dec-2008 | 7.7% | | 12-Nov-2001 | -6.2% |
| 9-Dec-2008 | -0.6% | | 13-Nov-2001 | 5.0% |
| | -11.0% | | 14-Nov-2001 | -8.6% |
| 5 Day | | | 15-Nov-2001 | -12.9% |
| Date | Ret% | | 16-Nov-2001 | 2.1% |
| 5-Dec-2008 | -16.8% | | 19-Nov-2001 | -1.9% |
| 8-Dec-2008 | 7.7% | | 20-Nov-2001 | 12.9% |
| 9-Dec-2008 | -0.6% | | 21-Nov-2001 | -2.0% |
| 10-Dec-2008 | -1.1% | | 22-Nov-2001 | 5.4% |
| 11-Dec-2008 | 10.1% | | | -2.2% |
| | -3.0% | | | |

Jan 2000 to Sep 2011

GOLD

| 3 Day | | | 10 Day | |
|---|---|---|---|---|
| Date | Ret% | | Date | Ret% |
| 7-Feb-2000 | 6.3% | | 3-Oct-2008 | -1.9% |
| 8-Feb-2000 | -5.4% | | 6-Oct-2008 | 5.6% |
| 9-Feb-2000 | 4.1% | | 7-Oct-2008 | 0.1% |
| | 4.6% | | 8-Oct-2008 | 3.0% |
| 5 Day | | | 9-Oct-2008 | -2.2% |
| Date | Ret% | | 10-Oct-2008 | 1.9% |
| 3-Feb-2000 | -0.2% | | 13-Oct-2008 | -8.0% |
| 4-Feb-2000 | 3.0% | | 14-Oct-2008 | 0.1% |
| 7-Feb-2000 | 6.3% | | 15-Oct-2008 | 1.7% |
| 8-Feb-2000 | -5.4% | | 16-Oct-2008 | 5.4% |
| 9-Feb-2000 | 4.1% | | | -6.5% |
| | 7.6% | | | |

Jan 2000 to Sep 2011

INDEX BKX U.S. FINANCIALS

| 3 Day | | | 10 Day | |
|---|---|---|---|---|
| Date | Ret% | | Date | Ret% |
| 29-Sep-2008 | -23.3% | | 17-Sep-2008 | -8.0% |
| 30-Sep-2008 | 14.7% | | 18-Sep-2008 | 12.9% |
| 1-Oct-2008 | 5.2% | | 19-Sep-2008 | 11.9% |
| | 6.2% | | 22-Sep-2008 | -11.1% |
| 5 Day | | | 23-Sep-2008 | -3.1% |
| Date | Ret% | | 24-Sep-2008 | -1.6% |
| 26-Sep-2008 | 2.5% | | 25-Sep-2008 | 2.1% |
| 29-Sep-2008 | -23.3% | | 26-Sep-2008 | 2.5% |
| 30-Sep-2008 | 14.7% | | 29-Sep-2008 | -23.3% |
| 1-Oct-2008 | 6.7% | | 30-Sep-2008 | 14.7% |
| 2-Oct-2008 | -3.2% | | | -9.3% |
| | -6.9% | | | |

Mar 2007 to Sep 2011

DJ U.S. TECH INDEX

| 3 Day | | | 10 Day | |
|---|---|---|---|---|
| Date | Ret% | | Date | Ret% |
| 13-Oct-2008 | 11.48% | | 9-Oct-2008 | -3.50% |
| 14-Oct-2008 | -4.14% | | 10-Oct-2008 | -0.83% |
| 15-Oct-2008 | -7.90% | | 13-Oct-2008 | 11.48% |
| | -1.6% | | 14-Oct-2008 | -4.14% |
| 5 Day | | | 15-Oct-2008 | -7.90% |
| Date | Ret% | | 16-Oct-2008 | 4.97% |
| 10-Oct-2008 | -0.83% | | 17-Oct-2008 | -0.23% |
| 13-Oct-2008 | 11.48% | | 20-Oct-2008 | 3.27% |
| 14-Oct-2008 | -4.14% | | 21-Oct-2008 | -5.57% |
| 15-Oct-2008 | -7.90% | | 22-Oct-2008 | -4.56% |
| 16-Oct-2008 | 4.97% | | | -8.2% |
| | 2.5% | | | |

Jan 2008 to Sep 2011

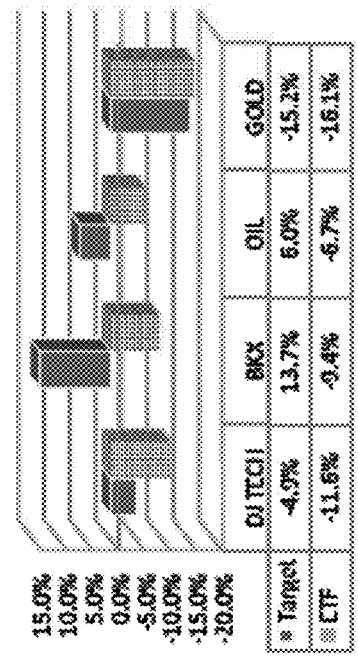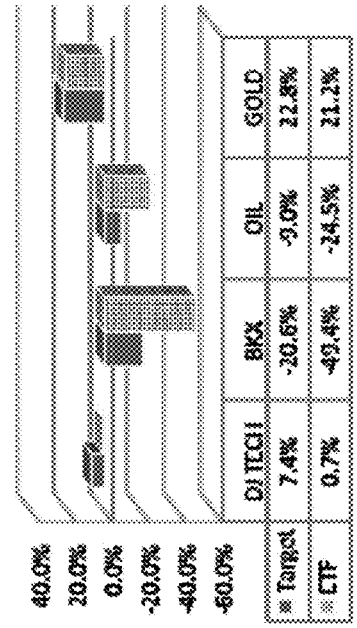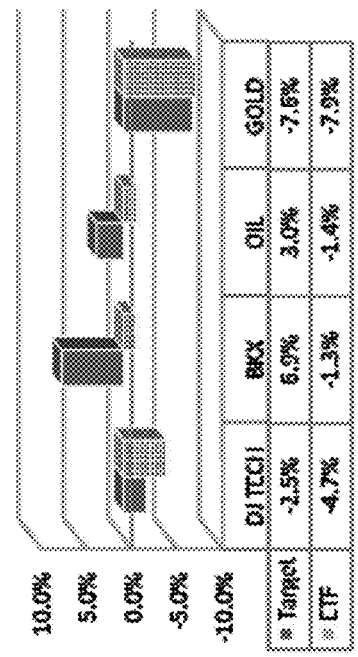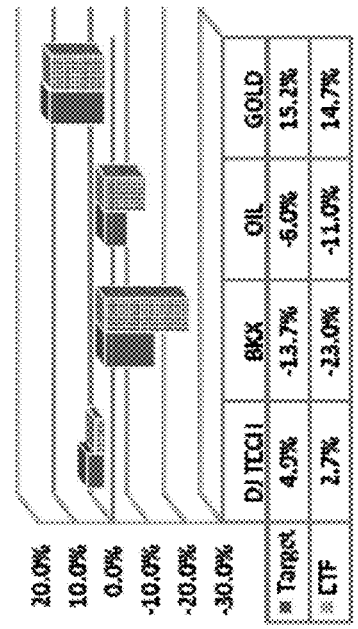
FIG. 2

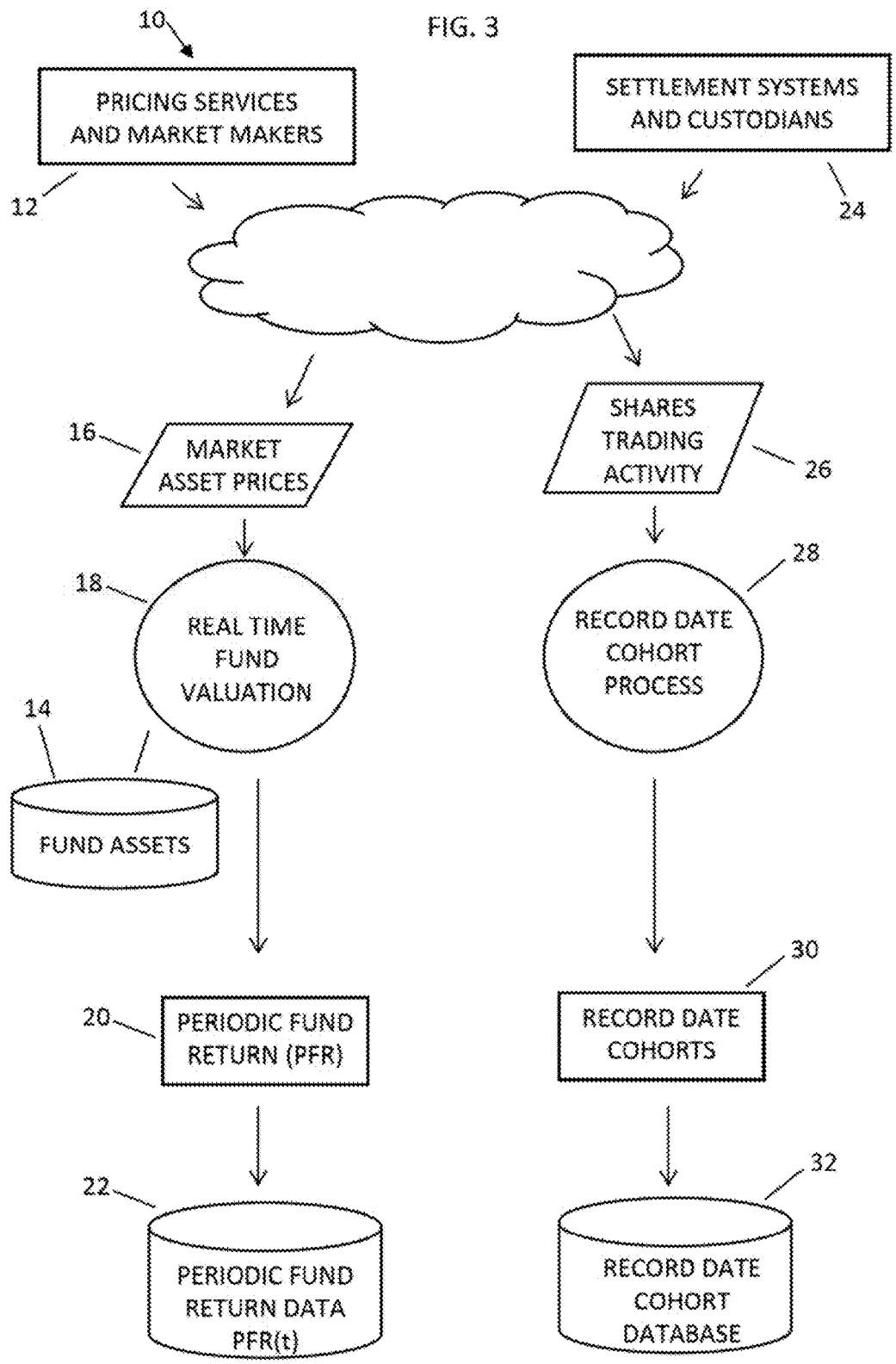

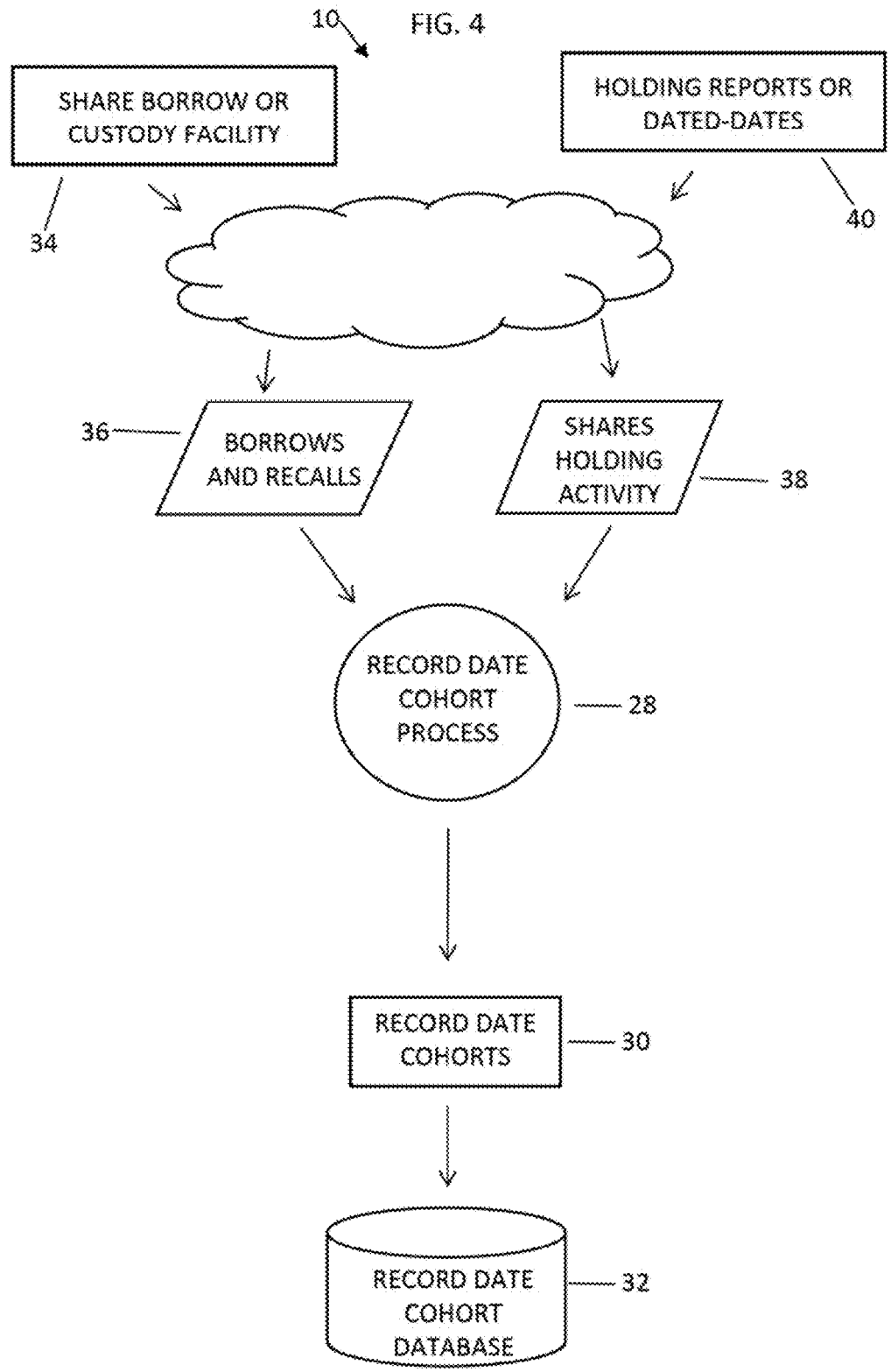

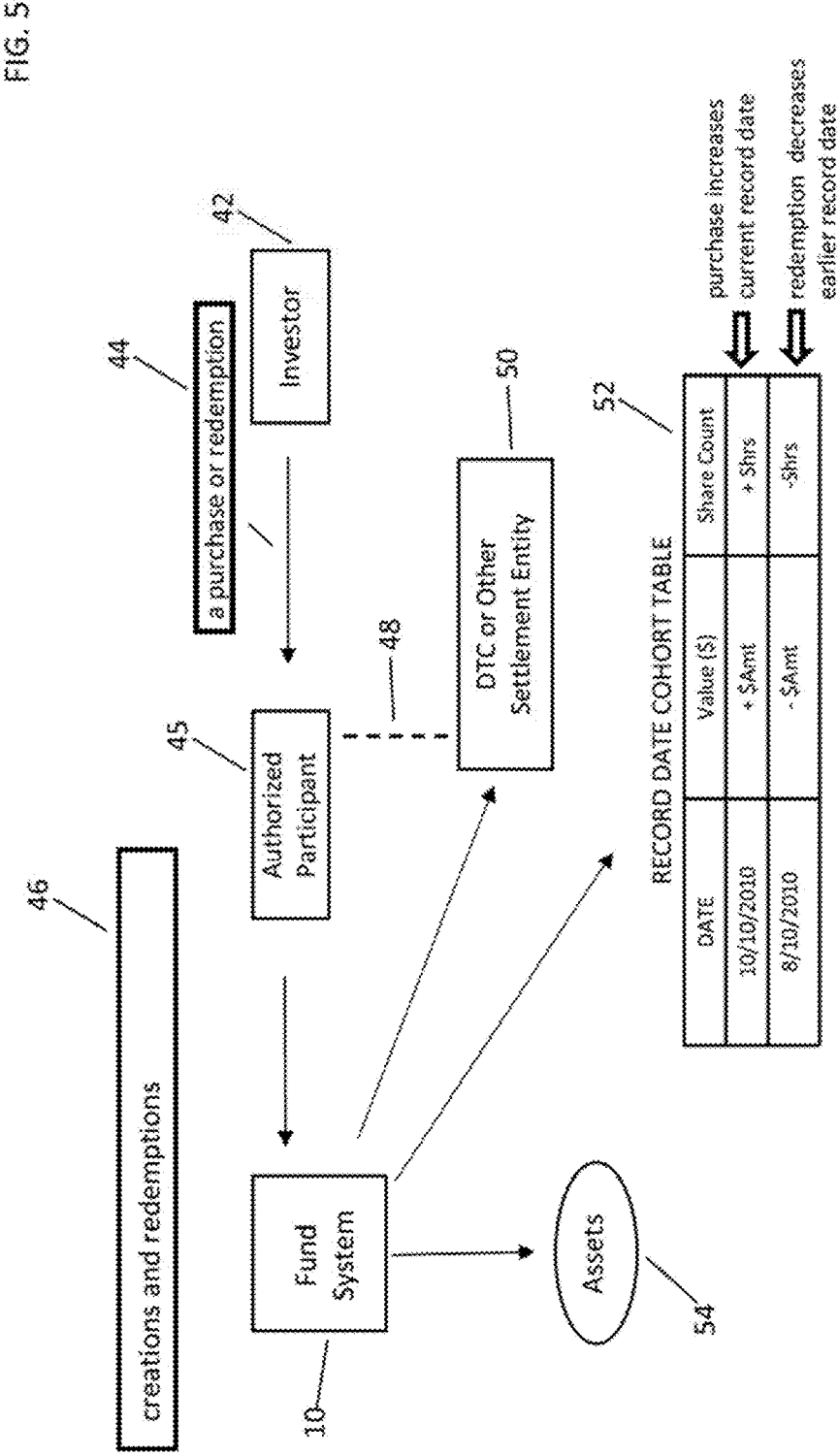

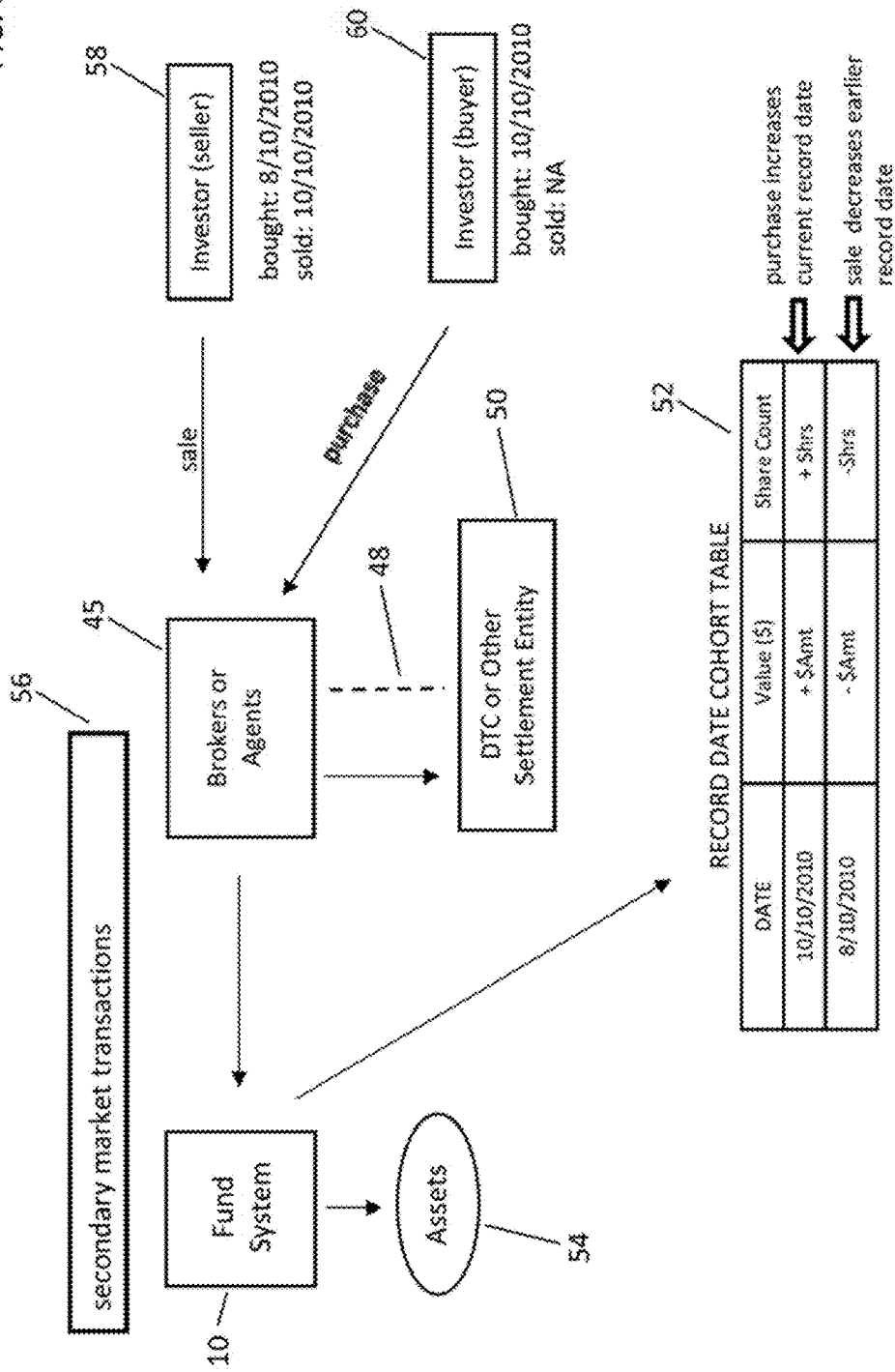

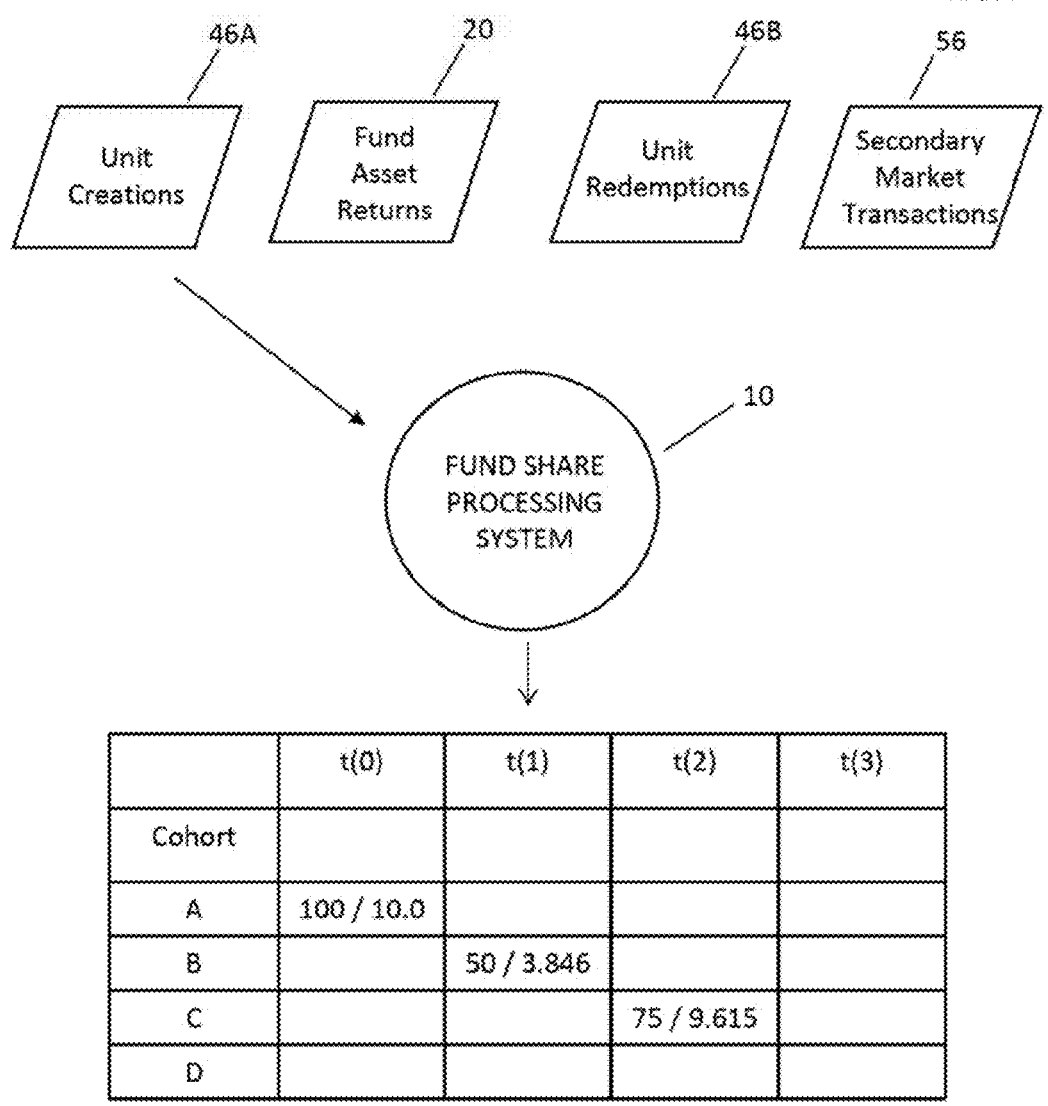

2-times Leveraged Fund

|  | t(0) | t(1) | t(2) | t(3) |
|---|---|---|---|---|
| Cohort |  | 15% | -20% | 15% |
| A | 100 | $100 \times (1.15)^{Lx2}$ | $100 \times (1.15) \times (.8)^{Lx2}$ | $100 \times (1.15) \times (.8) \times (1.15)^{Lx2}$ |
| B |  | 50 | $50 \times (.8)^{Lx2}$ | $50 \times (.8) \times (1.15)^{Lx2}$ |
| C |  |  | 75 | $75 \times (1.15)^{Lx2}$ |

Cohort A:

t(1): $100 \times (1 + [2 \times [-1 + (1.15)]]) = 130$ t(2): $100 \times (1 + [2 \times [-1 + (1.15) \times (1 - .20)]]) = 84$ t(3): $100 \times (1 + [2 \times [-1 + (1.15) \times (1 - .20) \times (1.15)]]) = 111.6$

2-times Leveraged Fund

|        | t(0) | t(1) | t(2)  | t(3)  |
|--------|------|------|-------|-------|
| Cohort |      | 15%  | -20%  | 15%   |
| A      | 100  | 130  | 84    | 111.6 |
| B      |      | 50   | 30    | 42    |
| C      |      |      | 75    | 97.5  |
|        |      |      |       |       |

Aggregate value at t(3) = 111.6 + 42 + 97.5 = 251.1
A Cohort percentage: 111.6 / 251.1 = 44.44%
B Cohort percentage: 42 / 251.1 = 16.73%
C Cohort percentage: 97.5 / 251.1 = 38.83%

FIG. 14 prior art – results from FIG. 9

| Period | | A | B | C |
|---|---|---|---|---|
| One | Shares | 10 / 10 | | |
| | Value | 100 / 130 | | |
| Two | Shares | 10 / 10 | 3.8462 / 3.8462 | |
| | Value | 130 / 78 | 50 / 30 | |
| Three | Shares | 10 / 10 | 3.8462 / 3.8462 | 9.615 / 9.615 |
| | Value | 78 / 101.40 | 30 / 39 | 75 / 97.5 | for each cell in the above table, X / Y indicates Period Open Value / Period Close Value <u>Record Date Cohort A</u>
Target Return for Cohort A:  $2 \times -1 + (1 + 15\%) \times (1 - 20\%) \times (1 + 15\%) = 11.6\%$
Prior Art Realized Return for Cohort A:  $(101.4 - 100) / 100 = 1.4\%$
Prior Art Return Pct: $1.4 / 11.6 = 12.1\%$
Prior Art Error: $(11.6 - 1.4) / 11.6 = 87.9\%$ Error <u>Record Date Cohort B</u>
Target Return for Cohort B:  $2 \times -1 + (1 - 20\%) \times (1 + 15\%) = -16\%$
Prior Art Realized Return for Cohort A:  $(39 - 50) / 50 = -22\%$
Prior Art % Error: $(22 - 16) / 16 = 37.5\%$ Error <u>Record Date Cohort C</u>
Target Return for Cohort C:  $2 \times -1 + (1 + 15\%) = 30\%$
Prior Art Realized Return for Cohort A:  $(97.5 - 75) / 75 = 30\%$
Prior Art % Error: $(30 - 30) / 30 = 0\%$ Error

FIG. 16 prior art – results from FIG. 10

| Period | | A | B | C |
|---|---|---|---|---|
| One | Shares | 10 / 10 | | |
| | Value | 100 / 130 | | |
| Two | Shares | 10 / 10.769 | 3.8462 / 3.8462 | |
| | Value | 130 / 84 | 50 / 30 | |
| Three | Shares | 10.769 / 11.0059 | 3.8462 / 4.1420 | 9.615 / 9.615 |
| | Value | 84 / 111.60 | 30 / 42 | 75 / 97.5 | for each cell in the above table, X / Y indicates Period Open Value / Period Close Value Record Date Cohort A
Target Return for Cohort A: $2 \times -1 + (1 + 15\%) \times (1 - 20\%) \times (1 + 15\%) = 11.6\%$
Invention Realized Return for Cohort A: $(111.6 - 100) / 100 = 11.6\%$
Invention Return Pct: $11.6 / 11.6 = 100\%$
Invention Error: $(11.6 - 11.6) / 11.6 = 0\%$ Error Record Date Cohort B
Target Return for Cohort B: $2 \times -1 + (1 - 20\%) \times (1 + 15\%) = -16\%$
Invention Realized Return for Cohort B: $(42 - 50) / 50 = -16\%$
Invention % Error: $(16 - 16) / 16 = 0\%$ Error Record Date Cohort C
Target Return for Cohort C: $2 \times -1 + (1 + 15\%) = 30\%$
Invention Realized Return for Cohort C: $(97.5 - 75) / 75 = 30\%$
Invention % Error: $(30 - 30) / 30 = 0\%$ Error

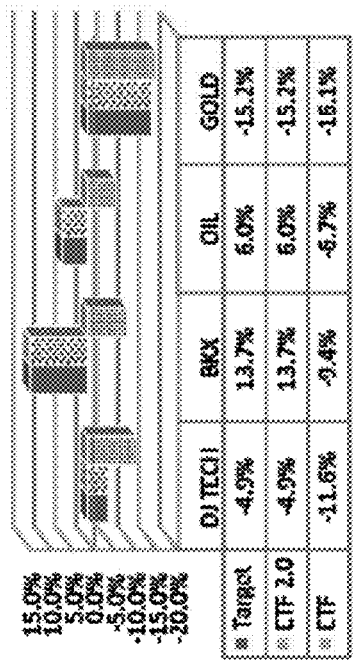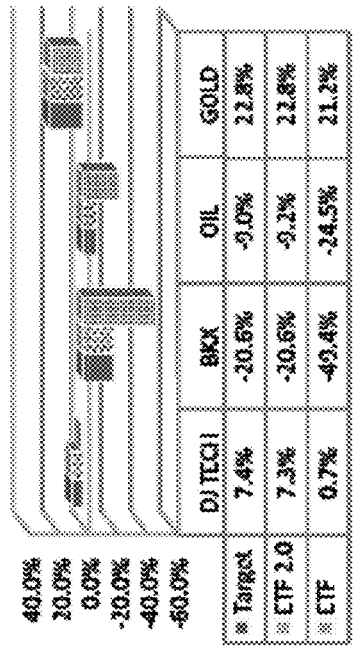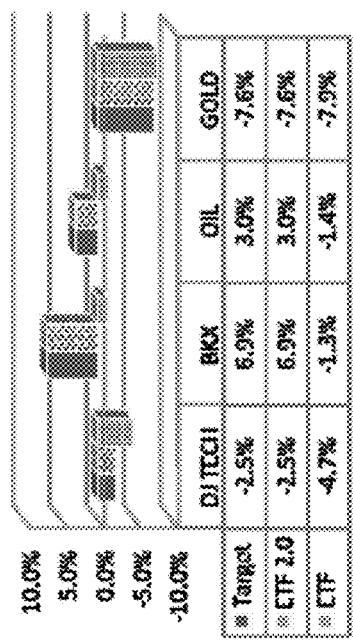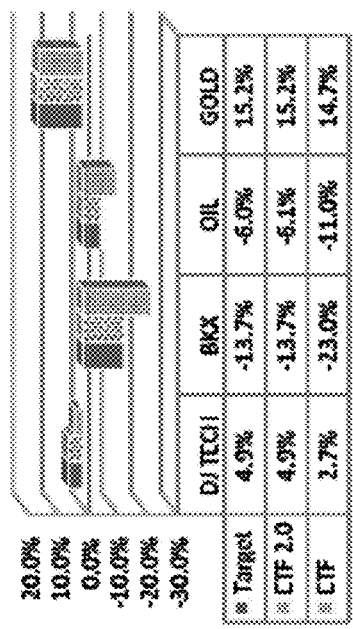
FIG. 17

SYSTEM AND METHOD FOR THE CREATION AND REBALANCING OF BENEFICIAL INTERESTS IN TRACKING INVESTMENT VEHICLES OVER MULTIPLE MARKET

CROSS REFERENCE TO RELATED APPLICATIONS

This application claims priority to U.S. Provisional Patent Application Nos. 61/501,231 filed Jun. 26, 2011; 61/515,310 filed Aug. 4, 2011; 61/535,644 filed Sep. 16, 2011 and 61/547,393 filed Oct. 14, 2011, each to Jack Fonss of New Canaan, Conn., USA, each for a "System And Method For The Creation And Rebalancing Of Beneficial Interests In Index Tracking Investment Vehicles Over Multiple Market Periods," the entire disclosure of each of which is incorporated herein by reference.

BACKGROUND OF THE DISCLOSED EMBODIMENTS

1. Field of the Disclosed Embodiments

The disclosed embodiments relate to electronic trading of funds, electronic funds management, and real-time fund processing systems 2. Background of the Disclosed Embodiments The majority of collective investment vehicles holdings are in the form of mutual funds, exchange traded funds, exchange traded notes, trust vehicles, and other similar collective arrangements. These collective arrangements have the benefit of bundling a collection of assets and other financial contracts into a single investable instrument for an investor. Depending upon the related investment strategy and the anticipated target investor audience, one form of collective arrangement may typically be preferred (e.g. exchange traded fund or "ETF", exchange traded note or "ETN", mutual fund, or other).

Investment vehicles provide an important service to the individual and (non-financial) institutional investor. Such vehicles warehouse and manage a collection of assets, liabilities and other financial contracts. They allow investors to access instruments, returns and market directionality that are otherwise unobtainable in conventional investments or only obtainable at prohibitive expense and complexity.

The availability of these vehicles is an important public policy matter; they serve to reduce or eliminate the structural disadvantages which smaller investors may suffer. That is, smaller investors generally traffic in a less complete, less comprehensive, and less competitively priced marketplace, and new vehicles and products can bridge that gap.

A more recent extension of the collective investment vehicle has been vehicles which purport and attempt to provide investors with investment returns which are either: (a) inversely related to the movement in a related index (the "inverse Return Vehicles"); or (b) positively related to index returns and amplified through a leveraging arrangement (the "Leveraged Return Vehicles").

Inverse Return Vehicles enjoy positive returns when the related index declines in value. For example, an Inverse Return Vehicle on U.S. equities would increase in value as the U.S. equity index it tracks declines. Inverse Return Vehicles may have a negative 1-times return target, or a multiple inverse target such as negative 2-times the related index returns.

On the other hand, Leveraged Return Vehicles enjoy amplified returns relating to the applicable index. For example Leveraged Investment Vehicles on a foreign currency would enjoy increased value if the foreign currency appreciated. The level of increase or gain in the fund would be magnified by a multiple of the leverage.

Public Policy Considerations

The availability of sophisticated collective investment vehicles is an important public policy goal. An equally pressing public policy goal should be to engineer (or reengineer) collective investment vehicles which deliver accurate strategies and returns to the investing public. As of Mar. 31, 2011, the market capitalization of leveraged (or structured) funds exceeded US$20 billion.

Existing structured funds are subject to delivering returns which can and have deviated materially from their investment objective. The market response to the deficiency in performance has been to tweak the disclosure to limit the applicability of the fund's headline strategy to a single trading day. Existing structured funds are subject to considerable tracking error from the linked index. In addition, not only do large tracking errors occur, but funds have sometimes delivered an entirely erroneous return in the opposite direction to what the fund purports to deliver (e.g. based on index movements, a fund should be up 10%, but instead the fund is down 20%).

The U.S. Securities and Exchange Commission (SEC) addressed the matter in a release entitled "Leveraged and Inverse ETFs: Specialized Products with Extra Risks for Buy-and-Hold Investors", August 2009; see (http://www.sec.gov/investor/pubs/leveragedetfs-alert.htm). In response to the SEC release and commentator criticism, the fund community largely responded by tweaking fund disclosure to absolve the funds from suitable performance for periods which extend beyond a single trading day. A typical example of structured fund disclosure is as follows:

" . . . [the fund] seeks a return of –100% of the return of an index (target) for a single day (before fees and expenses). Due to the compounding of daily returns, returns over periods other than one day will likely differ in amount and possibly direction from the target return for the same period. Investors should monitor holdings consistent with their strategies, as frequently as daily . . . "

Source: ProShares Short S&P500 Fact Sheet as of Sep. 30, 2010.

To further illustrate the problems in current trading methodology, attention will be turned to FIG. 1 and FIG. 2. FIG. 1 is a set of four tables containing historical daily return data for four indices including Oil, Gold, BKX, and DJ TECH. BKX is the KBW (Keefe Bruyette & Woods) Large Cap U.S. Bank Index currently comprised of the 24 largest U.S. banks. DJ TECH is the Dow Jones U.S. Technology Index and is comprised of all of the major publicly listed U.S. technology stocks with a current constituent list of 163 companies. Oil is the Brent London daily fixing. Gold is the London daily fixing. Each table contains the time period from which the returns were drawn in a footnote.

FIG. 2 is a set of four return comparison graphs which incorporate the 5-Day return series from FIG. 1. In each panel of the figure, all four indices are run through: (i) "Target" which is the arithmetically correct 5-Day return given the related return sequence, and (ii) "ETF" which applies the typical industry methodology. Beginning with the panel in the upper left-hand corner and moving clockwise, the panels indicate the following fund targets: (1) a –1× inverse fund, (2) a –2× inverse fund, (3) a +3× positively leveraged fund, and (4) a +2× positively leveraged fund. Each index is indicated along the x-axis, and percentage return is indicated along the y-axis.

FIGS. 1 and 2 demonstrate the shortcomings of the typical industry methodology. FIG. 1, as indicated, contains selected daily return data for four popular investment indices; oil, gold, U.S. financial stocks, and U.S. technology stocks. The daily returns indicated in the figure were selected because they were periods of maximum annualized volatility for the time periods indicated in each table. FIG. 2, as indicated, uses the 5-Day return series for each of the four indices, and runs the return series through: (i) a target return calculation which is the algebraic multiplication as indicated below ("Target"), and (ii) the conventional ETF applying the typical industry methodology indicated as "ETF" in the Figure.

In FIG. 2, "Target" indicates the return an investor should receive (without errors created by the known methods) and can be indicated as below for a 2-times leveraged fund:

Target Return=$2\times[-1+(1+R1)\times(1+R2)\times(1+R3)\times(1+R4)\times(1+R5)]$ where R(t) is the daily return for day "t."

In FIG. 2, The ETF return uses the algorithms currently in use by all structured funds. The typical industry methodology does not use a system to generate accurate share returns, but instead relies on a simple compounding of assets, a leveraging of gains and de-leveraging of losses, and constant leverage of debt. In the context of a 2-times leveraged fund, existing finds use equations essentially equal to:

Assets$_t$=Assets$_{t-1}\times(1+2\times R_t)$

Debt$_t$=Debt$_{t-1}$+Assets$_{t-1}\times R_t$ where, R is the periodic market return on the indicated assets.

The return for a share holder in existing funds is based on the change in price of his share holdings from period to period, and the share price for any period will be:

Price$_t$=[Assets$_t$−Debt$_t$]/Shares$_t$ where, Shares is the outstanding number of shares as of the related determination.

FIG. 2 illustrates four bar graph return comparisons. Inverse funds are present on top (a −1× fund on the left, and a −2× fund on the right), and leveraged funds are presented on the bottom (a 2× leverage fund on the left, and a 3× leveraged fund on the right). Each graph contains all four indices and both methods of return ("Target" is the algebraic return which should be delivered in an accurate fund, and "ETF" is based on the typical industry methodology).

Across all four target returns (−1×, −2×, +2×, +3×) and across all four indices (DJ Tech, BKX, Oil, and Gold), the typical industry methodology delivers (i) a directionally incorrect return for the inverse BKX funds and the inverse oil funds, (ii) large tracking errors and material underperformance in all of the DJ Tech funds and in the leveraged BKX and leveraged Oil, and (iii) small underperformance in all Gold funds. Existing fund methods do not match the Targeted return in any of the examples and existing fund methods consistently underperform. For simplicity, fees and other costs are excluded from the analysis.

Consistent with FIG. 1 and FIG. 2, the investor educational materials published by one of the largest structured ETF providers, ProFunds Group (a.k.a. ProShares), confirm the short-comings of the typical industry methodology, including return failures for periods longer than a single day, and underperformance in the presence of market volatility—underperformance relating to volatility applies to any investment period where return directions vary.

Currently published on the ProFunds website under "Understanding Long-Term Performance: The Universal Effects of Compounding and Leveraged Funds" (web address immediately follows), ProFunds indicates:

"2× leveraged fund—A fund designed to provide twice (200%) the daily return of an index or other benchmark. (These funds do not attempt to produce the return during any period other than a day. Results for longer than one trading day will likely differ from the return of twice the index over the longer period.)"

"The effect of compounding can help returns in upward- and downward-trending markets and hurt in volatile markets, assuming all other variables remain the same. Investors should recognize that over time this effect can be magnified significantly in leveraged funds. The use of leverage generally increases the risk of investing in the funds. Leveraged funds are not suitable for all investors. Investors should actively monitor their holdings consistent with their strategies, as frequently as daily."

(http://www.profunds.com/pricesperformance/content/universaleffectsofcompounding.html)

The unfavorable attention from the Securities and Exchange Commission relating to the short-comings in existing funds dating back to August 2009, and the current disclosure (November 2011—above web address from the largest fund company in structured ETF indicates a long felt need for novel innovation in the area. Data from FINRA (the U.S. Financial Industry Regulatory Authority) indicate that sales of structured investment to retail investors increased at a rate of 38% from 2009 to 2010 further indicating a long felt need for innovation in the tracking of returns of investment funds based on the increasing demand and usage of structured investment instruments. For example, the article at the web link discloses:

"The Universal Effects of Compounding and Leveraged Funds

Compounding is a universal mathematical concept that affects the returns of investments. It is important for all investors to understand how compounding affects returns in different market conditions—upward-trending, downward-trending and volatile. For leveraged fund investors, it is particularly important to understand that the effect of compounding on leveraged funds is significantly magnified and can cause gains and losses to occur much faster and to a greater degree.

Compounding with unleveraged investments:

Let's take a look at how compounding affects unleveraged returns in upward-trending, downward-trending and volatile markets.

When '10+10=21'

In an upward-trending market, compounding can result in longer-term returns that are greater than the sum of the individual daily returns. An investor who starts with $100 in an investment that grows 10% a day for two consecutive days would have $121, or a 21% gain. This is greater than the sum of the individual day returns, or 20%.

When '−10+−10=−19'

In a downward-trending market, compounding can also result in longer-term returns that are less negative than the sum of the individual daily returns. An investor who starts with $100 in an investment that declines 10% a day for two consecutive days would have $81, or a −19% return. This is less negative than the sum of the individual day returns, or −20%.

When '10+−10=−1'

In a volatile market, compounding can result in longer-term returns that are less than the sum of the individual daily returns. An investor who starts with $100 in an investment that rises 10% on one day and declines 10% the next would have $99, or a −1% return. This is less than the sum of the individual day returns, or 0%.

When '20+20=44'

In an upward-trending market, compounding can result in longer-term leveraged returns that are greater than two times the return of the unleveraged investment. An investor who starts with $100 in a leveraged fund that grows 20% a day (2×10% index gain) for two consecutive days would have $144, or a 44% gain. This is greater than two times the 21% compound gain of the unleveraged investment.

When '−20+−20=−36'

In a downward-trending market, compounding can also result in longer-term leveraged returns that are less negative than two times the return of the unleveraged investment. An investor who starts with $100 in a leveraged fund that declines 20% a day (2×10% index decline) for two consecutive days would have $64, or a −36% return. This is less negative than two times the 19% compound loss of the unleveraged investment.

When '20+−20=−4'

In a volatile market, compounding can result in leveraged longer-term returns that are less than two times the return of the unleveraged investment. An investor who starts with $100 in a leveraged fund that rises 20% one day (2×10% index gain) and declines 20% the next (2×10% index decline) would have $96, or a −4% return. This is four times less than the −1% compound return of the unleveraged investment (see sidebar). Compounding can also result in returns that are in the opposite direction of the underlying index during periods of unusual volatility.

Does compounding affect the returns of conventional index funds? If so, why don't I see it?

Over time, compounding can make returns of an indexed investment either greater than or less than the simple sum of the individual daily returns. However, this effect is not easy to see by merely comparing the return of the investment versus the return of the index. The reason? Conventional indexes such as the S&P 500 and the Dow Jones Industrial Average have the effect of compounding incorporated into their returns.

Why aren't the longer-term returns of a 2× leveraged fund normally two times the return of its underlying index?

The impact of compounding on a 2× leveraged fund is generally greater than twice the impact of compounding on an equivalent unleveraged investment. As a result, the longer-term return of a leveraged fund can be significantly greater than or less than two times the return of its underlying index for the time period. For instance, the leveraged fund return in the volatile market example on this page (third example) results in a 4% loss, a much greater loss than two times the 1% loss in the unleveraged volatile market example (third example).

In summary

The effect of compounding can help returns in upward- and downward-trending markets and hurt in volatile markets, assuming all other variables remain the same. Investors should recognize that over time this effect can be magnified significantly in leveraged funds. The use of leverage generally increases the risk of investing in the funds. Leveraged funds are not suitable for all investors . . . "

The disclosed embodiment is distinguished from the state of the art in the elimination of adverse path dependency. Under adverse path dependency, if the periodic index movements change direction (i.e. the index return series is not monotonic), the beneficial interests in such investment vehicles will underperform the targeted index. Even worse, returns in the state of the art funds may deliver returns opposite of those intended in periods of high market volatility. FIG. 2 is an illustration of the adverse path dependency in conventional funds.

As highlighted in the above referenced SEC release, the current state of the art investment vehicle performance may diverge from its intended course when measured over more than a single trading day. The disclosed embodiment, by contrast, causes trading of beneficial "interests" or "shares", referred to herein as "units", to accurately track the intended course for extended periods of time. As a consequence, the system outlined in the disclosed embodiment introduces a beneficial long term aspect to the securities market, investing and risk management in contrast to the one day speculative nature of the current fund arrangements. Further, aggressive end-of-day asset rebalancing in existing fund structures may contribute to undesirable market volatility and the disclosed embodiment eliminates return related asset rebalancing under normal market conditions.

SUMMARY OF THE DISCLOSED EMBODIMENTS

The disclosed technology includes systems and processes which create and adjust the beneficial interests (shares, notes, or other investment units, the "interests", "units", or "shares") in collective investment vehicles (funds, trusts, or other collective arrangements). The disclosed process is specifically applied to create units, and subsequently adjust the number of such created units. Units, when created shall represent tangible property of the holder such that the units can be sold, pledged, or otherwise transacted as an article of property with precise values based on fund parameters.

The disclosed technology encompasses systems which communicate with securities exchanges, market makers, brokerage firms, custodians, investors, and the administrator of the investment vehicle. Such communications enable the market value of the interests to accurately track an underlying reference index, over time horizons equal to or longer than one trading day. Such accurate tracking occurs even in a collective investment vehicle relating to leveraged or inverse returns.

In addition to long term index tracking, the disclosed technology causes each holder of an interest to begin and end with consistent index tracking regardless of acquisition timing. In particular, the disclosed technology communicates and processes the information associated with daily unit rebalancing such that:

(i) the investor's individual holdings correctly track the returns of the desired index over multiple market periods;

(ii) the system produces accurate opening, closing, and intra-period prices by running its processes continuously with real-time exogenous market inputs;

(iii) the investor's holdings are continuously tradable during the course of a market period at then prevailing prices if provided for within the specific implementation; for example a mutual fund may not be tradeable throughout the day;

(iv) the fund or vehicle administrator may accurately manage the assets and liabilities held by the fund to conform with (i) above; and (v) during unexpected movements in the related index or during anomalous market conditions, the system enables the fund administrator to identify units for Record Date Cohort (as defined below) adjustment is such that the net asset value of the fund is maintained at an appropriately positive level.

The disclosed technology entails specific algorithms and routines running on computer systems. In addition, the disclosed technology can store the above information in databases for access by the parties to the units. The process, system, and created units solve an intractable problem in the structured funds space.

BRIEF DESCRIPTION OF THE DRAWINGS

Features of the disclosed embodiment will be apparent from the Detailed Description of the Disclosed Embodiments, provided below, taken in connection with the accompanying drawings, in which:

FIG. 1 is a set of four tables containing historical daily return data for four indices including Oil, Gold, BKX, and DJ TECH.;

FIG. 2 is a set of four return comparison graphs which incorporate the 5-Day return series from FIG. 1 indices;

FIG. 3 is a diagram indicating the system processing of two primary exogenous variables processed by the system;

FIG. 4 is a diagram indicating alternate share trading activity data processing;

FIG. 5 is a diagram which illustrates the mechanics for populating and amending Record Cohort Dates in the context of creations and redemptions;

FIG. 6 is a diagram which illustrates the mechanics for populating and amending Record Cohort Dates in the context of secondary market transactions;

FIG. 7 is a diagram illustrating a 3-period, 3-investor Record Date Cohort table population;

FIG. 14 is tabular representation of the results from FIG. 13 indicating both the shares and values attributable to each Record Date Cohort at each period of the illustration;

FIG. 16 is a tabular representation of the results from FIG. 15 in the same format as FIG. 14;

FIG. 17 is a set of four comparison graphs in the same format as FIG. 2, except that FIG. 17 includes the performance of the disclosed embodiment in addition to the returns presented in FIG. 2.

DETAILED DESCRIPTION OF THE DISCLOSED EMBODIMENTS

Figure 3A:
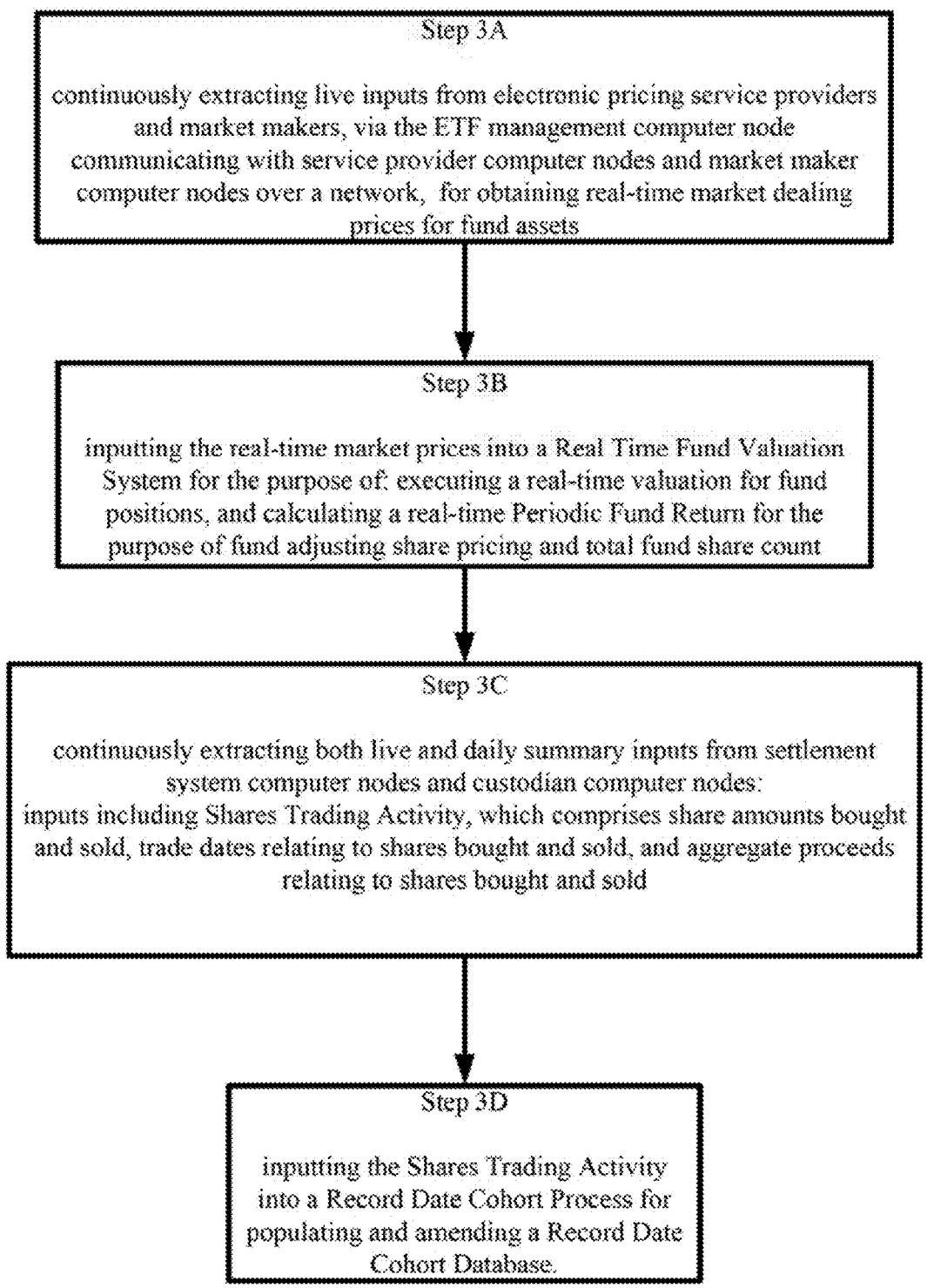
FIG. 3a is a diagram illustrating the steps performed in FIG. 3 and described in the related disclosure.

As will be explained more completely below, the disclosed embodiments relate to information systems and to real-time processes residing on a computer system. More specifically, the disclosed embodiments relate to systems and methods for creating, tracking, and adjusting the beneficial interests of collective investment vehicles on a real-time basis based on exogenous market price movements and transaction activity in the beneficial interests.

More specifically, a system is disclosed which creates, tracks and Modifies the units of a collective investment vehicle, and causes such units to accurately track a linked index or specific investment strategy over multiple periods through the execution of steps including: creating units at market prices during a market period; assigning the created units to cohorts determined by their date of creation or date of acquisition by a subsequent investor; maintaining the assets of the investment vehicle in an uncompounded manner in amounts consistent with aggregate invested amounts of all cohorts; creating and publishing intra-period price values for the units which integrate exogenous market inputs and proform a share count adjustments on a real-time basis; and following the close of each market period, increasing the number of units outstanding, such that each cohort possesses an outstanding number of units that: (i) is equal to or larger than the number of units immediately preceding such adjustment, and (ii) is proportionally equivalent to such cohort's percentage interest in the net asset value of the vehicle.

In addition, as will be disclosed below, the disclosed embodiment provides systems and processes that create, process, repeatedly modify, and otherwise manage the beneficial interests and the holdings of a collective investment vehicle. As used herein, the terms "beneficial interest", "interest", "units", or "shares" are used interchangeably. Also as used herein, the terms "collective investment vehicle", "investment vehicle", and "fund" are used interchangeably.

The disclosed system and method therefore creates the units to be held by investors. The disclosed system and method therefore modifies the outstanding units, such that their return properly tracks the targeted index. As will be clear from the description below, various disclosed systems comprise computer-implemented processes and related computer systems, data storage, and networks.

The disclosed system and method therefore entails administration and management of a collective investment vehicle. Such administration and management address the deficiencies and failings of existing fund arrangements which purport to offer inverse or leveraged index returns.

The fund may be implemented in a variety of vehicle forms. Such forms include a fund, a partnership, a trust, notes of an entity, derivatives claims, or interests in an entity including but not limited to a corporation.

The units may be implemented in variety of forms. Such forms include notes, deposits, shares, units interests, or hybrids thereof.

The basic mechanics solely relating to the creation of the units of the fund will be largely consistent with existing practices. Consistent with existing practices, the fund will engage one or more securities brokers or banks to act in the capacity of authorized participants or distributors, and such authorized participants or distributors will coordinate with the fund administrator to create new units based on market demand. Relating to the limited activities of issuing shares through authorized participants or distributors, the disclosed system and method utilizes methods essentially similar to existing funds, notes or deposits. Integral to the disclosed system and method therefor is tracking and adjusting the share count of a Record Date Cohort (where the Cohort is, e.g., a grouping of shares in a unit at any given time) between the time a share is created, redeemed and/or otherwise transacted. The mechanics relating to the record dates and Record Date Cohorts, managing and calculating outstanding share counts, calculating intra-period, opening and closing share prices, and the processes relating to fund holdings are novel as described herein.

The investment vehicles considered herein typically have incidental expenses (fees, other transactional costs, and interest expense) and incidental income relating to the holding of cash and related positions. Such amounts are incorporated in a conventional manner and are assumed away (not included) for clarity in the presentation of the disclosed system.

Beginning with FIG. 3, the figure is a diagram indicating the system processing of the two primary exogenous variables processed by the system: (1) market asset prices will be input into the system to value the existing fund assets on a continuous real-time basis, and (2) trading activity in the fund shares will be input into the system to update and amend the Record Date Cohort process. Clinic As illustrated in FIG. 3, the system will poll external sources for the exogenous inputs required for system processing.

Starting at the top left of FIGS. 3 and 3a, and moving down the left branch, the system 10 at Step 3A continuously extracts live inputs from pricing service providers and market makers 12 for real-time dealing prices for fund assets 14. Such pricing is derived from sources such as exchanges including Bloomberg, Reuters, interdealer brokers, and major market makers, and depending upon the particular fund implementation, includes bond prices, commodity prices, and stock prices relating to major stock indices.

The system at Step 3B inputs the real-time market prices 16 into a "Real Time Fund Valuation System" 18, e.g., the novel disclosed embodiment, which is disclosed in more detail below, for the purpose of: executing a real-time valuation for fund positions, and calculating a real-time Periodic Fund Return 20 ("PRF") for the purpose of fund share pricing and fund share adjustments disclosed below.

Periodic Fund Return is described more completely below, but in brief, Periodic Fund Return, for any point of determination (e.g. intraday or following a market close), is the percentage return on fund assets from the immediately preceding period open, to the time of such Periodic Fund Return determination. Periodic Fund Return data at any given time (t) ("PRF(t)" 22) represents measurements made, for example, periodically, several times a minute, such as four times a minute, and the Periodic Fund Return result is stored as an intermediate value in the system processing.

Moving to top right of FIG. 3 and moving down the right branch, the system 10 at Step 3C continuously extracts both live and daily summary inputs 24 from settlement systems, custodians and other related agents (e.g. the Depository Trust Company, Broadridge Financial, FINRA, NYSE/Arca, and other intermediary settlement systems). The inputs include, share amounts bought and sold, trade dates relating to shares bought and sold, and aggregate proceeds relating to shares bought and sold (collectively, the "Shares Trading Activity" 26).

At Step 3D, the system inputs the Shares Trading Activity 26 into a "Record Date Cohort Process" 28, disclosed in detail below, for the purpose of populating and amending a "Record Date Cohort Database" 32, also disclosed in more detail below, and FIGS. 6 and 7 will be addressed for support of these features.

The Record Date Cohort Database 32 contains the necessary details for managing a system implemented dataset which contains the purchase date for each outstanding share. The Record Date Cohort Database 32 is more fully described below; in brief the Record Date Cohort Database 32 includes a two-way table in which: (i) each business day since fund launch is contained in the leftmost column, and (ii) the number of shares purchased and still held by such original investor is in the rightmost column. Each share group linked to a common acquisition date is a "Record Date Cohort" 30. That is, the Record Date Cohort is the date in which the Cohort (grouping of shares) is initially created, in response to a transaction by in investor.

Figure 4A:
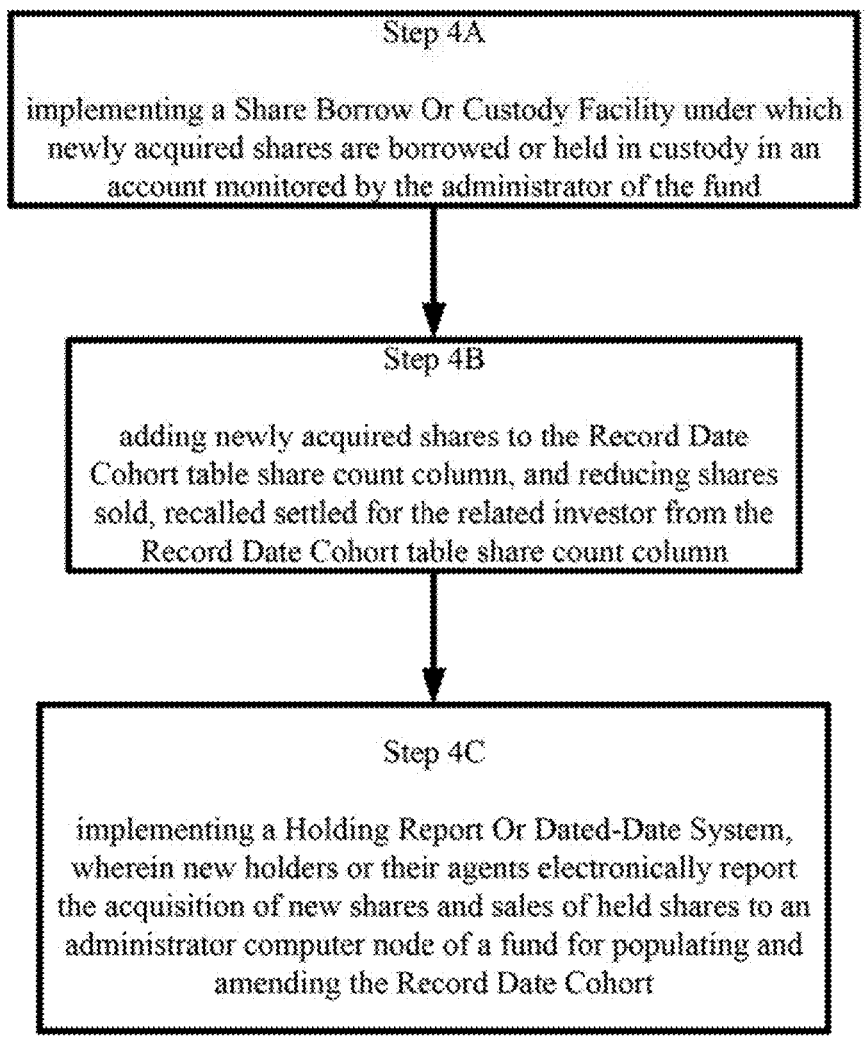
FIG. 4a is a diagram illustrating the steps performed in FIG. 4 and described in the related disclosure.

Moving to FIGS. 4 and 4a, the figure is a diagram indicating alternate share trading activity data processing. In lieu of, or in addition to the settlement systems share tracking indicated in FIG. 3, that is, starting from here or starting from Step 3D, FIG. 4 indicates input from: (1) a share borrow facility in which share borrows and share borrow recalls will be utilized to track share trading, and (2) a holding report or dated-date system which will be fed by, individual shareholders or their agents (e.g. brokers, custodians). Inputs from (1) and (2) may be used as system process inputs to update and amend the Record Date Cohort process.

More specifically, as illustrated in FIG. 4, the system may supplement the shares trading activity and Record Date Cohort tracking described in FIG. 3 with additional inputs for the purpose of populating and amending Record Date Cohorts 30. Beginning at the top-left of FIG. 4, the system 10 at Step 4A, which may or may not follow directly from Step 3D, implements a commonly known Share Borrow Or Custody Facility 34 under which newly acquired shares are borrowed (into) or held in custody in an account monitored by the administrator of the fund. At Step 4B, the system adds shares newly acquired 36 to the Record Date Cohort table share count, and shares sold (recalls) 36 will be returned to or otherwise settled for the related investor. That is in the same step, the system reduces such sold shares in the related Record Date Cohort table share count.

Remaining with FIG. 4, top-right the system may also supplement the Shares Holding Activity 38 described above with Step 4C of implementing a commonly known Holding Report Or Dated-Date System 40. Utilizing the Holding Report Or Dated-Date System 40, new holders or their agents explicitly electronically report the acquisition of new shares and the sale of held shares to the administrator of a fund for the purpose of populating and amending the Record Date Cohort 30.

Further, shares may be tagged automatically during the process of clearing with a "dated date" indicating the date of acquisition. Under the Holding Report 40 arrangement, investors may be required to report acquisitions as a condition of trade settlement or as a condition to benefit from system share adjustments. Further, investors may be required to report dispositions to receive any increase in shares deliverable by the system 10.

If the reports or services indicated in FIG. 3 and FIG. 4 become unavailable due to system 10 disruptions, discontinuation of service, or their data is otherwise not useable for the purposes needed by the system, the system may proxy or estimate the construct of Record Date Cohorts 30 with aggregated cohorts. This fallback approach utilizes the same processes. Under any secondary market transaction, however, the fallback approach may make assumptions including the assumption that record date holders on all preceding dates have sold proportionally or as otherwise indicated by available market trading data.

Figure 5A:
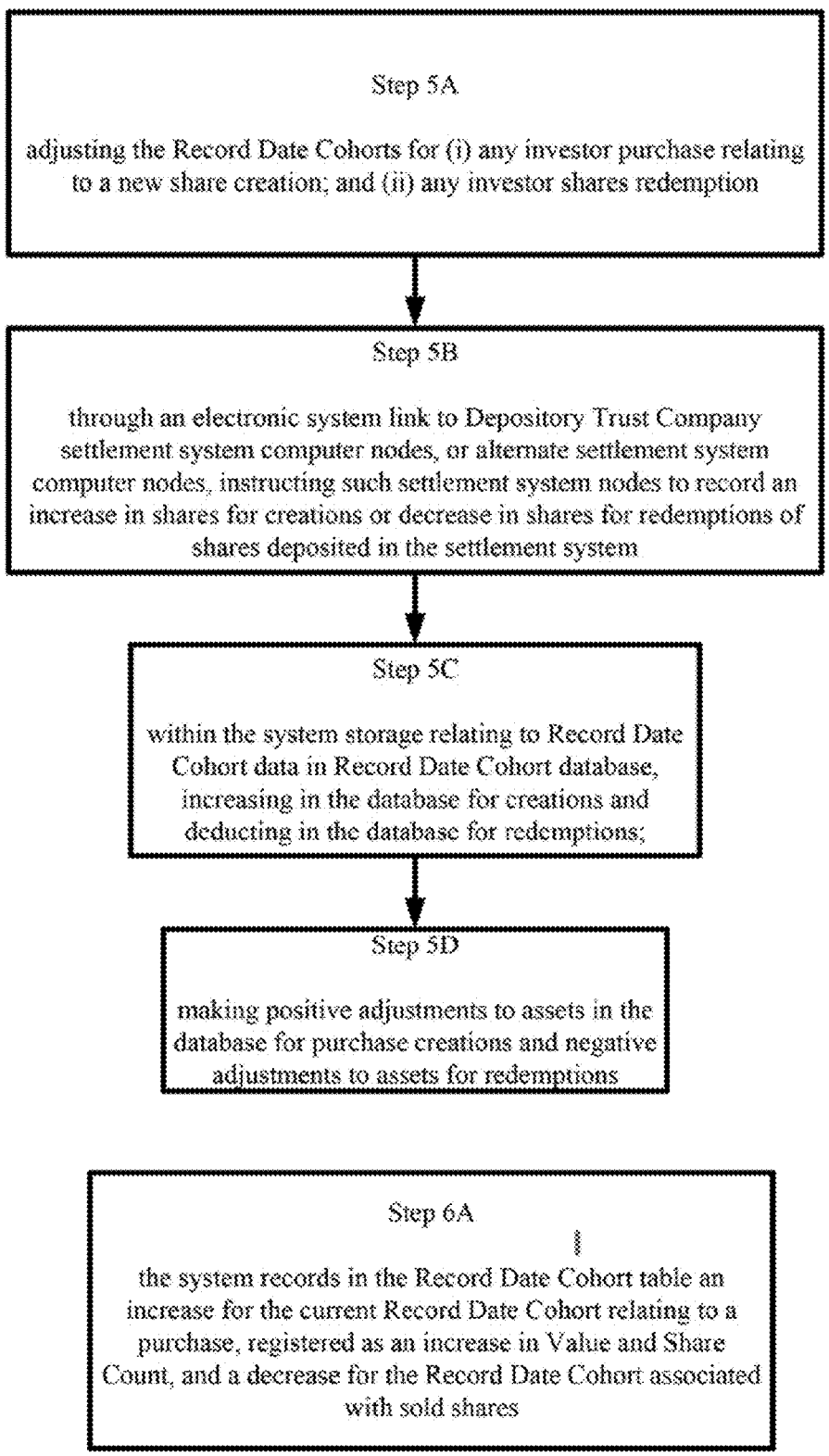
FIG. 5a is a diagram illustrating the steps performed in FIGS. 5 and 6 and described in the related disclosure.

Moving to FIGS. 5 and 5a, the figure is a diagram which illustrates the mechanics for populating and amending Record Cohort Dates in the context of Creations And Redemptions 46. The steps in this figure follow from Step 3D.

In FIG. 5, beginning with "Investor" 42, and moving in a counterclockwise direction, at Step 5A, the system adjustments the Record Date Cohorts for (i) any investor purchase 44 relating to a new share creation, and (ii) any investor shares redemption 44. Share creations and share redemptions 46 will be communicated to and settled with the Fund System 10 through an Authorized Participant 45, such as a fund broker.

Triggered by a creation or redemption transaction, the fund system 10 will perform three steps. In an initial step, at Step 5B, the fund system 10, through a system link 48 to a known Depository Trust Company (DTC) 50, or alternate settlement systems, increases (for creations) or decreases (for redemptions) the shares deposited in the settlement system.

In a further step, at Step 5C, the fund system 10 causes, within the system storage relating to Record Date Cohort data in Record Date Cohort database 32 (FIG. 3), increases for creations and deductions for redemptions. The Record Date Cohort Table 52 illustration in FIG. 5 and stored in the Record Date Cohort Database 32, depicts an increase in value (+$Amt) and share count (+Shrs) for an Oct. 10, 2010 (i.e., Oct. 10, 2010) Record Date Cohort (relating to a new creation) and a decrease in value (−$Amt) and share count (−Shrs) for an Aug. 10, 2010 (i.e., Aug. 10, 2010) Record Date Cohort (relating to a redemption of shares originally acquired on Aug. 10, 2010).

In an additional step, at Step 5D, the fund system 10 makes positive adjustments to assets 54 for purchase creations and negative adjustments to assets 54 for redemptions. The description relating to FIG. 15, below, illustrates system asset adjustments.

FIG. 6, and remaining with FIG. 5a, is a diagram which illustrates the mechanics for populating and amending Record Cohort Dates in the context of secondary market transactions. Th More specifically, FIG. 6 is an extension of FIG. 5, and thus follows from Step 5D, illustrating the system processes relating to Secondary Market Transactions 56. Secondary market transactions are contrasted with the primary market transactions (creations and redemptions illustrated in FIG. 5) in that the fund (and fund systems) are not directly involved in Secondary Market Transactions 56.

The Secondary Market Transactions 56 considered in FIG. 6 include any transfer of ownership of outstanding shares between unrelated parties. Such unrelated parties include selling investors 58 and buying investors 60.

There are at least two distinctions between primary (FIG. 5) and Secondary Transactions 56 illustrated in FIG. 6. The first distinction is the brokers executing the Secondary Market Transaction 56 communicate directly with the related settlement entity, such as DTC or other settlement system. The second distinction is identified as Step 6A where the system modifies the Record Date Cohort table 52 by indicating an increase for the current Record Date Cohort (e.g., 30 in FIG. 3) relating to the purchase, registering as an increase in Value and Share Count. On the other hand, the Record Date Cohort table 52 indicates a decrease for the Record Date Cohort associated with the sold shares (i.e. the seller's acquisition date).

FIG. 7 through FIG. 11 illustrates the system management of the Record Date Cohorts. The figures illustrate management by the system 10 of Creations and Redemptions (see element 46, FIG. 5, though the creations and redemptions are separated out in these figures as 46A and 46B), and Fund Asset Returns 62 are illustrated between Creations and Redemptions. In addition, Secondary Market Transactions 56 are illustrated.

FIG. 7 is a diagram illustrating a 3-period, 3-investor Record Date Cohort table population. As illustrated in the figure, cohort A invests $100 for 10 created units at time t(0), cohort B invests $50 for 3.846 created units at time t(1), and cohort C invests $75 for 9.615 created units at time t(3).

More specifically, FIG. 7 illustrates a population of Record Date Cohorts based on Unit Creations 46A. FIG. 7 depicts 3 separate unit creation events processed through the fund share processing system 10. FIG. 7 illustrates how an investor or investors purchasing, e.g., $100, $50, and $75 dollars worth of shares across three sequential trading days (t(0), t(1), t(2)) would be reflected in the Record Date Cohort table 52 stored in the database 32.

Within each cell of the table, the Record Date Cohort is depicted as "X/Y". "X" is the dollar amount attributable to the cohort, and "Y" is the shares amount. As further expanded in reference to FIG. 15 below, the price path for the shares over the three periods (Period 1; Period 2; and Period 3 in FIG. 15) illustrated is $10, $13, and $7.80 respectively, as listed under "Price" in the Open column for each period in FIG. 15.

For Record Date Cohort A (all shares acquired on date t0), the invested amount is $100 and the shares are 10 ($100/10, where $10 is the "Price" of the shares at the open of Period 1)). For Record Date Cohort B (all shares acquired on date t1), the invested amount is $50 and the shares are 3.846 (from $50/13, where $13 is the "Price" of the shares at the close of Period 1). For Record Date Cohort C (all shares acquired on date t2, the invested amount is $75 and the shares are 9.615 (from $75/7.80, where $7.80 is the "Price" of the shares at the close of Period 2).

Figure 8:
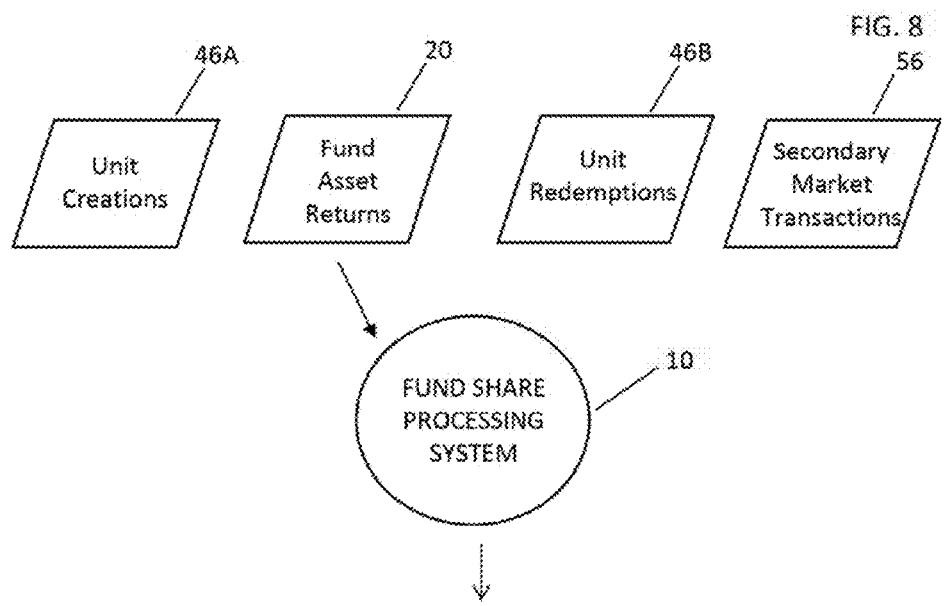
FIG. 8 is a diagram representing an extension of FIG. 7 in which a series of three periodic returns are applied to the FIG. 7 Record Date Cohorts to calculate liquidation values for each Record Date Cohort.

FIG. 8 is a diagram representing an extension of FIG. 7 in which a series of three periodic returns (of 15%, −20%, and 15%) are applied to the FIG. 7 Record Date Cohorts to calculate liquidation values for each Record Date Cohort.

More specifically, FIG. 8 illustrates the system integration of the periodic Fund Asset Returns 62 (e.g., the Periodic Fund Return, element 20 in FIG. 3) to the Record Date Cohorts (e.g., element 30 in FIG. 3). Across the first data row in the table, are the indicated Periodic Fund Asset Returns (Periodic Fund Return), stored as Periodic Fund Return Data (PFR(t)) (element 22 in FIG. 3).

For each of t(1) through t(3) in FIG. 8, the illustrated returns are +15%, −20%, +15% respectively, as listed in the "Cohort" row. As indicated in FIG. 7, the initial entry for any Record Date Cohort is its initial invested amount and initial share count. FIG. 8 illustrates the system process for Record Date Cohort entries for dates subsequent to the initial date. For each subsequent date, the Periodic Fund Return is applied in a manner consistent with the calculations at the bottom of FIG. 8, illustrating the calculations for determining cohort value ("Cohort Liquidation Value" or "CLV") for Cohort A at each of t(1), t(2), and t(3).

That is, at the end of t(1), the value of Cohort A is determined by:

Cohort. A: 100×(1+[2×[−1+(1+15%)]])=130; generally, in the formula: "100" is the initial investment for Cohort A; "2" is the leverage, "(1+15%)" is the gain from unity at the close of (t(1)).

At the end of t(2), the value of Cohort A is determined by:
Cohort A: 100×(1+[2×[−1+(1+15%)×(1−20%)]])=84; generally, in the formula: "(1−20%)" is the loss from unity at the close of (t(2))

At the end of t(3), the value of Cohort A is determined by:
Cohort A: 100×(1+[2×[−1(1+15%)×(1−20%)×(1+15%)]])=116.60; generally, in the formula: "(0.1+15%)" is the gain from unity at the close of (t(3)).

FIG. 8 illustrates a 2-times leveraged fund, and as such, the Cohort Liquidation Value at t(3) for Cohorts A, B, and C is calculated by the system as follows:

Cohort A: 100×(1+[2×[−1+(1+15%)×(1−20%)×(1+15%)]])=116.60; generally, in the formula: "100" is the initial investment for Cohort A; "2" is the leverage, "(1+15%)" is the gain from unity at the close of (t(1)); "(1−20%)" is the loss from unity at the close of (t(2)); and "(1+15%)" is the gain from unity at the close of (t(3)).

Cohort B: 50×(1+[2×[−1+(1−20%)×(1+15%)]])=42; generally, in the formula, "50" is the initial investment for Cohort B; "2" again is the leverage, "(1−20%)" is the loss from unity at the close of (t(2)); "(1+15%)" is the gain from unity at the close of (t(3)); note the change from unity at t(1) is not provided as Cohort B initial investment occurs at t(2) not Cohort C: 75×(1+[2×[−1+(1+15%)]])=97.5; generally, in the formula, "75" is the initial investment for Cohort C; "2" again is the leverage, "(1+15%)" is the gain from unity at the close of (t(3)); note the change from unity at t(1) and t(2) are not provided as Cohort C initial investment occurs at t(3).

For completeness, relating to Record Date Cohort A (a.k.a Record Date Cohort t0), the system will carry a table entry for each day beginning at day t(0) and running to the date of determination.

Figure 9:
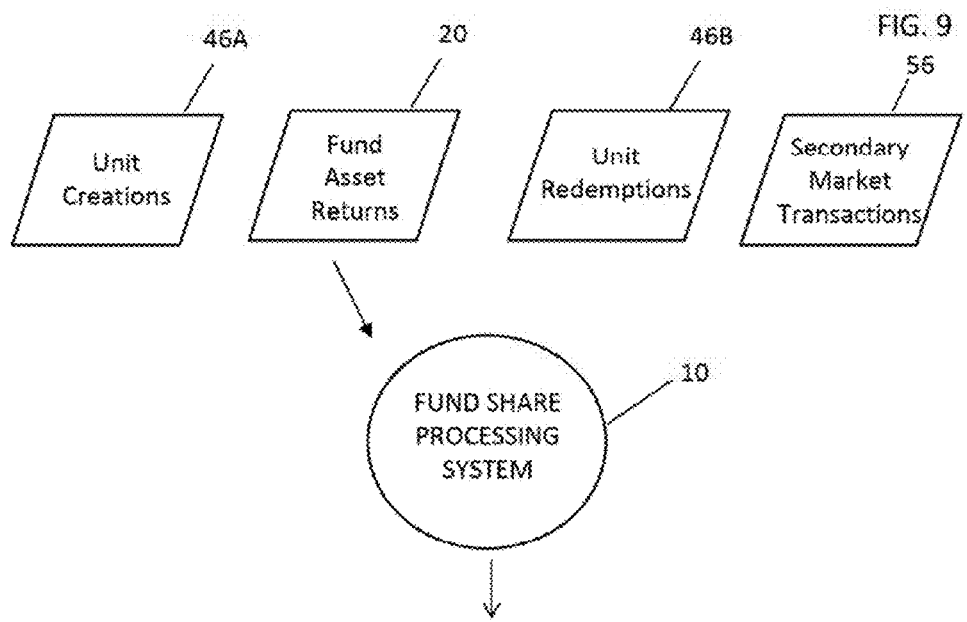
FIG. 9 is a diagram representing an extension of FIG. 8 in which each Record Date Cohort for each period contains its Cohort Liquidation Value.

FIG. 9 is a diagram representing an extension of FIG. 8 in which each Record Date Cohort for each period contains its Cohort Liquidation Value. The algebraic expressions below the table indicate the aggregate Cohort Liquidation Value and the relative percentage of each Record Date Cohort at time t(3).

FIG. 9 processes all of the Record Date Cohort entries stored in the Record Date Cohort. Database (element 32, FIG. 3) for all dates for all Record Date Cohorts (element 30, FIG. 3) in a manner consistent with the process at the bottom of FIG. 8. FIG. 9 also indicates the value percentage of each cohort ("Cohort Liquidation Percentage" or "CLP") at t(3) which is determined by dividing each cohorts "Cohort Liquidation Value", by the aggregate Cohort Liquidation Value across cohorts. In the illustration the Cohort Liquidation Percentage for Record Date Cohorts A, B, and C at t(3) are 44.44%, 16.73%, and 38.83% respectively. This is because the aggregate value is 251.1 at t(3) and A Cohort's value is 111.6, B Cohort's value is 42, and C Cohort's value is 97.5.

Figure 10:
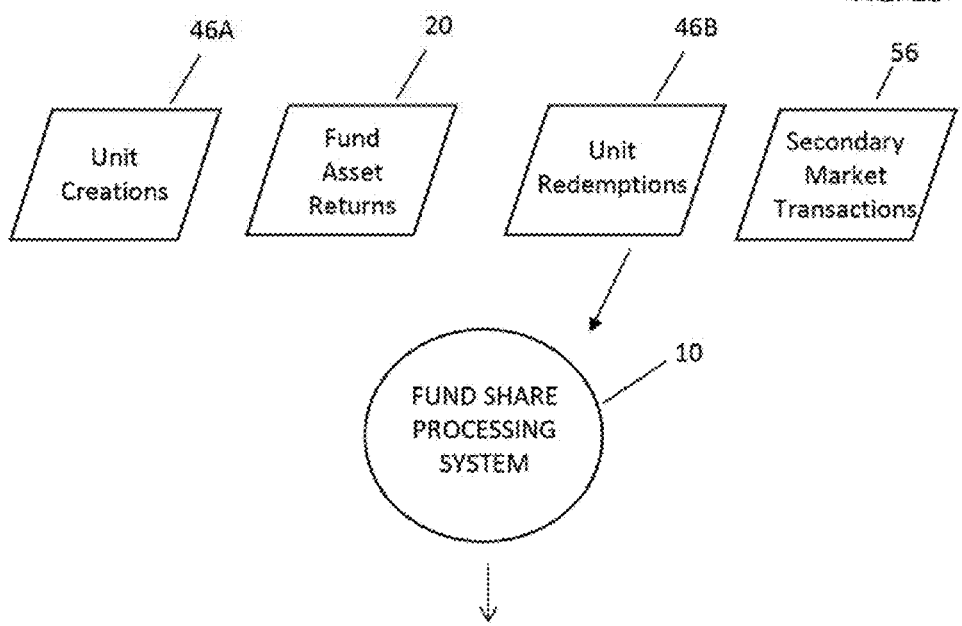
FIG. 10 is an extension of FIG. 9 and it indicates a modification to the Record Date Cohort table in the instance of a unit redemption of Cohort B.

FIG. 10 is an extension of FIG. 9 and it indicates a modification to the Record Date Cohort table in the instance of a unit redemption of Cohort B.

That is, as illustrated, FIG. 10 applies a unit redemption to the Record Date Cohort table of FIG. 9. In FIG. 10, Record Date Cohort B, has been redeemed and as such its entries for all dates are indicated as zero (0) by the system.

Figure 11:
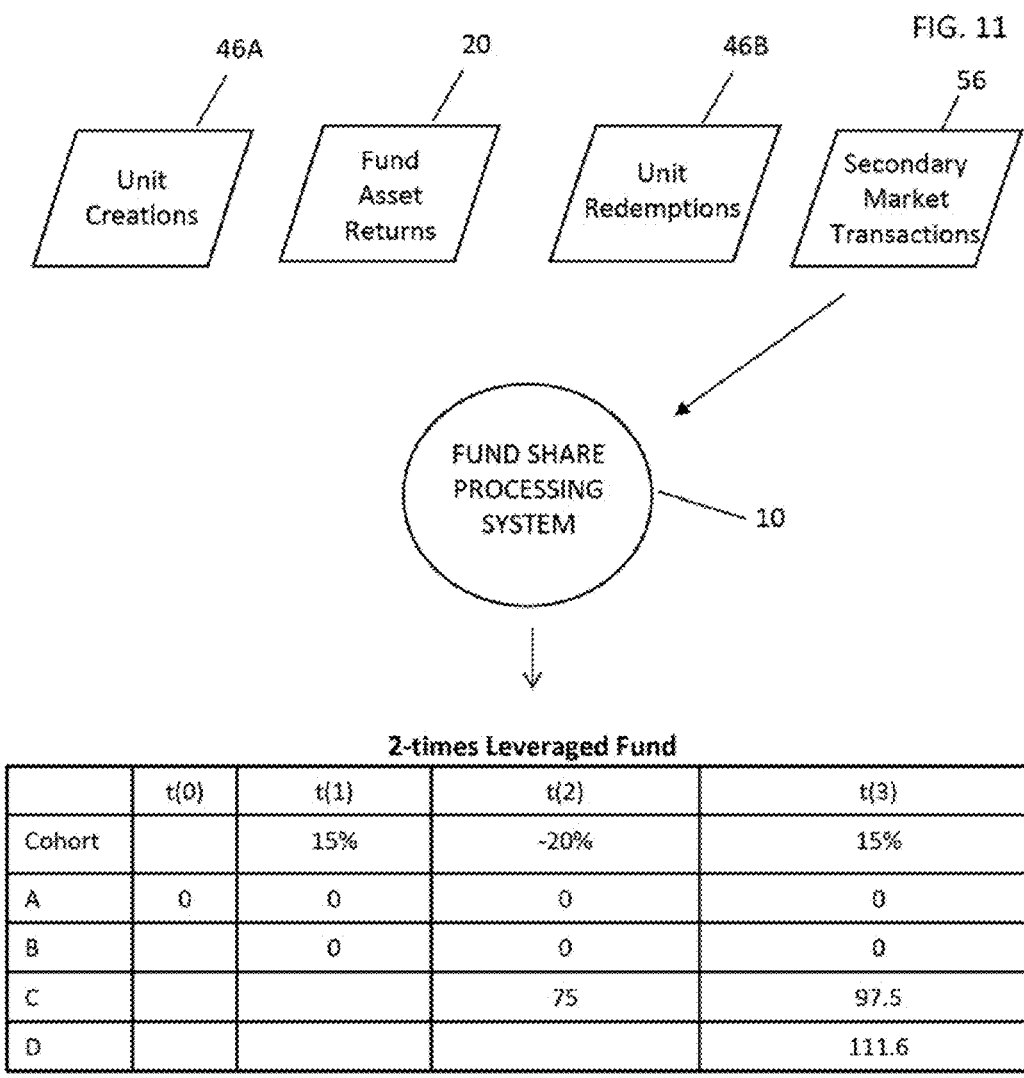
FIG. 11 is an extension of FIG. 10 and it indicates a modification to the Record Date Cohort table in the instance of a secondary market transaction in which all of the value and shares relating to Record Date Cohort A are sold and purchased by Record Date Cohort D investors.

FIG. 11 is an extension of FIG. 10 and it indicates a modification to the Record Date Cohort table in the instance of a secondary market transaction in which all of the value and shares relating to Record Date Cohort A are sold and purchased by Record Date Cohort D investors.

That is, as illustrated, FIG. 11 applies a secondary market transaction to the Record Date Cohort table stored in the Record Date Cohort Database (element 32, FIG. 3) in FIG. 10. In FIG. 11, the holder or holders of Record Date Cohort A sells the entire holding to holders indicated in the table by Record Date Cohort D. As indicated in the figure, under a Secondary Market Transaction (element 56 in FIG. 6) the system reduces the selling cohort amounts and increases the purchasing cohort amount, e.g., by 111.6, the value of the Cohort traded by A. The Record Date Cohort representing the newly purchased shares will populate the cohort linked to the trade date of the newly purchased shares. In FIG. 11, this date is t(3).

Remaining with FIG. 11, the system can be programmed to prevent excessive losses by creating thresholds, at which the system liquidates a cohort. For example, if Record Date Cohort A suffers an aggregate loss since inception in excess of a predetermined threshold (examples of such threshold would be a 50%, or 70% loss of initial capital), the system would cause the investors and capital represented to Record Date Cohort A to be reassigned to a record date equal to the record date on which such threshold loss occurred. A Record Date Cohort's base or watermark for any subsequent loss threshold tests would be the then prevailing value of such Record Date Cohort (the cohort liquidation value) at the time of such reassignment. If such loss occurred at time t(3), the liquidation value of Record Date Cohort A would be zeroed out by the system and assigned to the Record Date consistent with t(3); Record Date Cohort D. Of course, the value of the traded cohort would not be 111.6, as such does not represent a loss in the illustration in FIG. 9.

The remaining figures and detailed description outlines how the system processes all of the Record Date Cohorts relating to a fund in order to produce: (i) accurate investor holding period returns, (ii) revised Record Date Cohort share counts, and (iii) accurate intra-period and period closing share prices including net asset value reporting.

Figure 12:
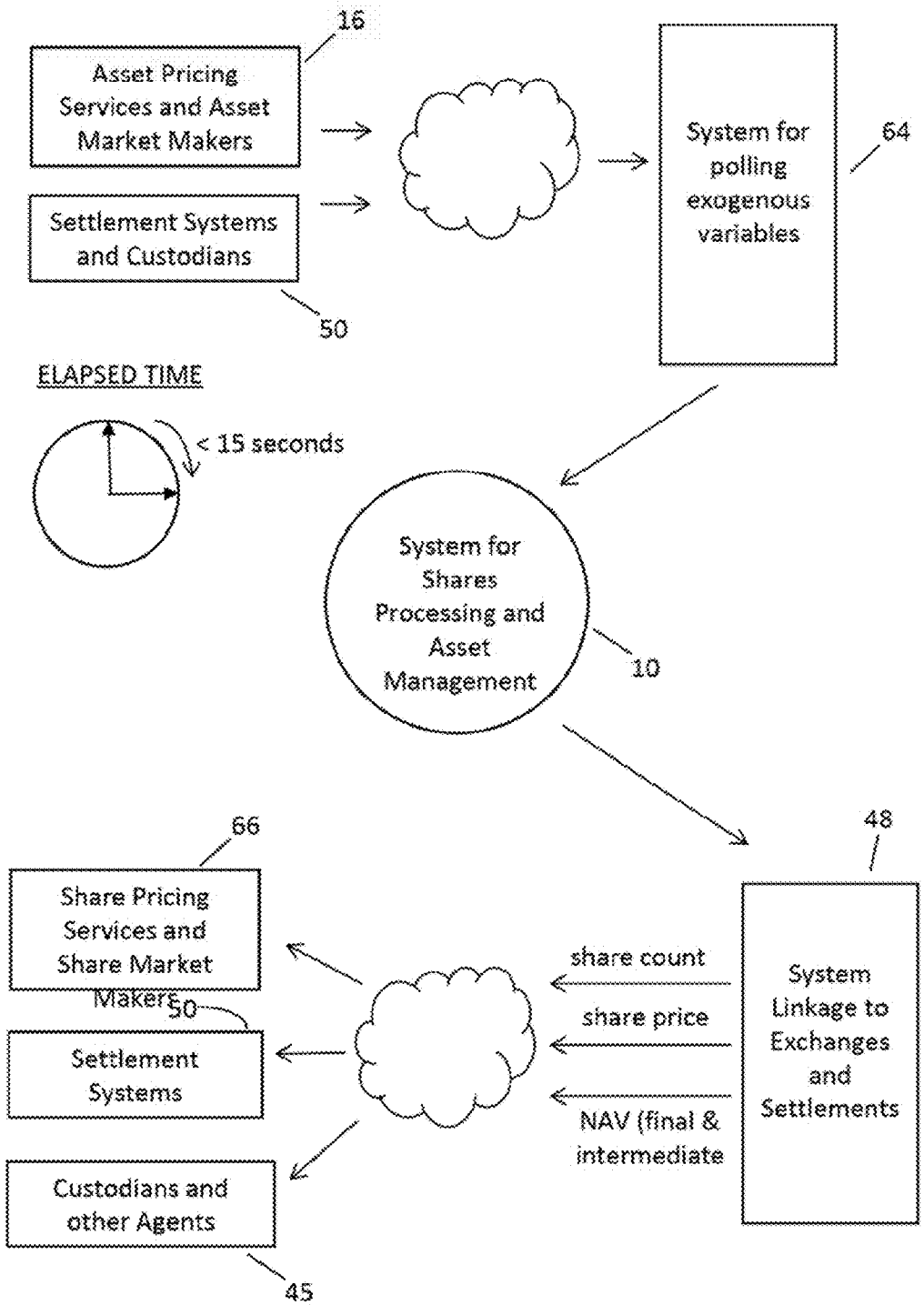
FIG. 12 is a diagram depicting the system's inputs and outputs. The diagram starts in the upper left hand corner, where exogenous inputs are gathered by the system, travels clockwise, and ends with the output of share counts, share prices, and net asset values through a network system.

FIG. 12 is a diagram depicting the system's inputs and outputs. The diagram starts in the upper left hand corner, where exogenous inputs are gathered by the system, travels clockwise, and ends with the output of share counts, share prices, and Net Asset Values through a network system.

That is, as illustrated in FIG. 12, beginning in the top left-hand corner and proceeding clockwise, in a frequency of, for example, several times a minute, such as four times a minute, the system will: (1) poll, using known systems 64, for the exogenous variables including asset prices and fund share trading activity consistent with FIG. 3, (2) create, amend and process all of the fund's Record Date Cohorts consistent with FIG. 5 through FIG. 11, and (3) create, revise and distribute using typical computer implementations 66 share counts, share prices, and net asset values (NAV) on a real time using the system encompassing the following steps.

System Steps

Figure 15:
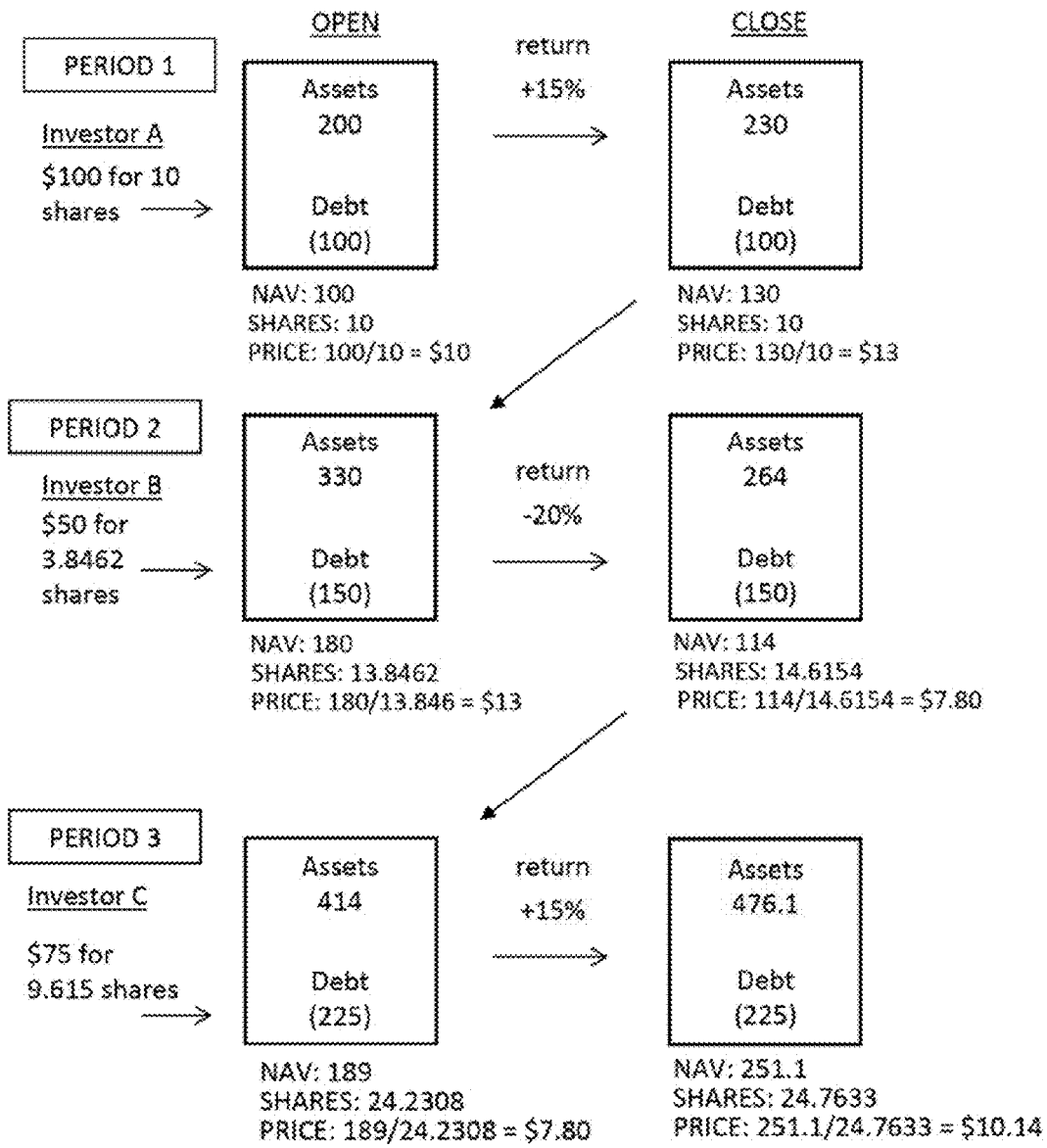
FIG. 15 is a diagram illustrating the investor returns and outcomes based on the disclosed embodiment.
Figure 15A:
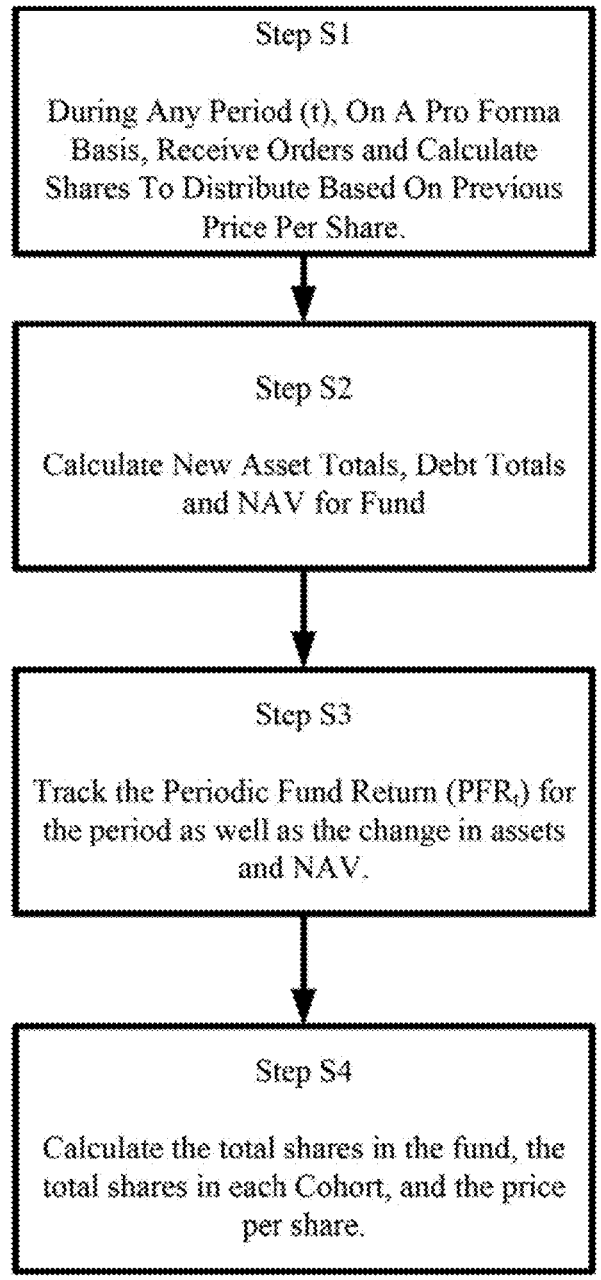
FIGS. 15A and 15B are flow charts illustrating the methodology performed by the system in obtaining the values listed in FIG. 15.
Figure 15B:
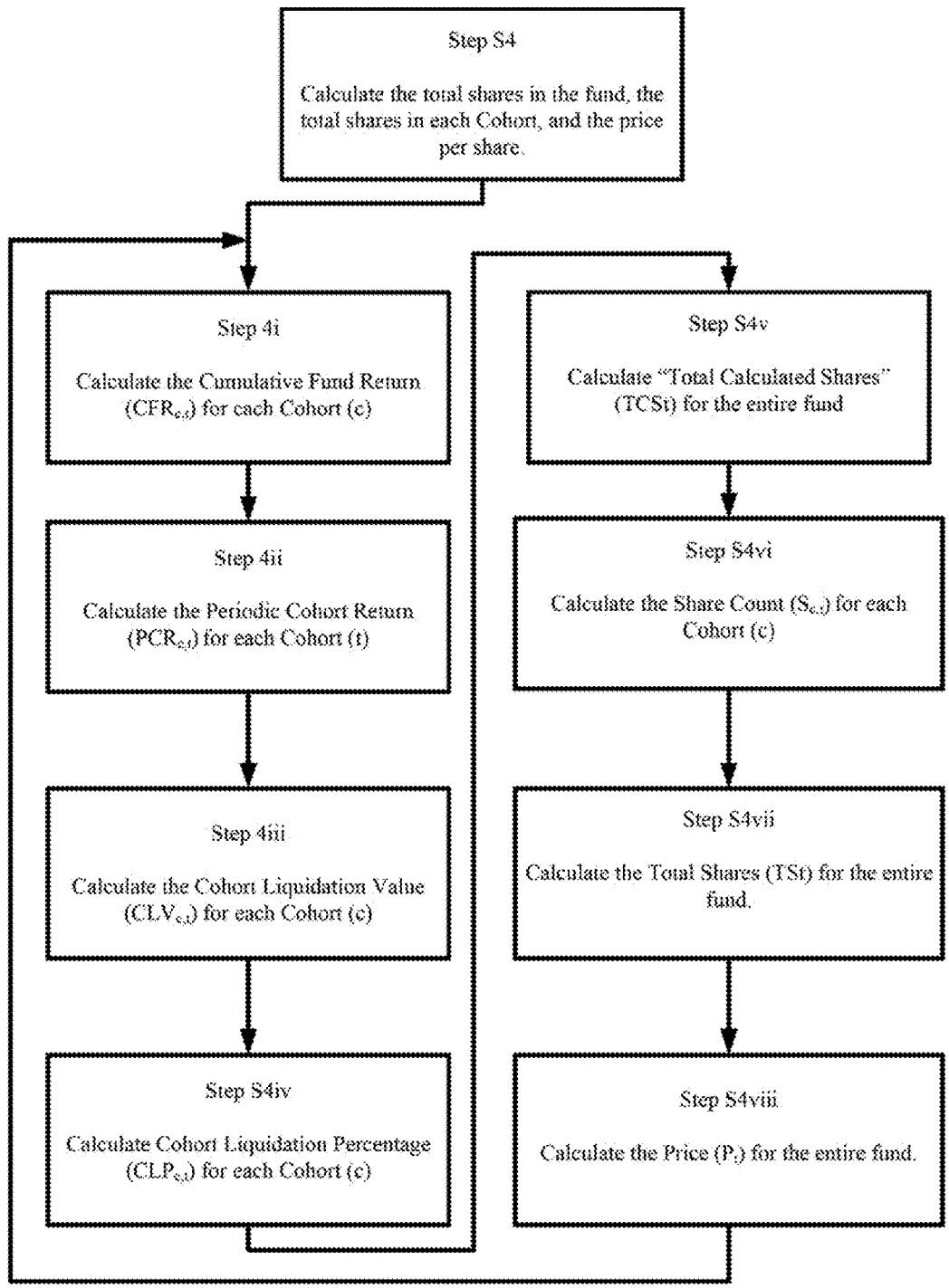
Figure 18:
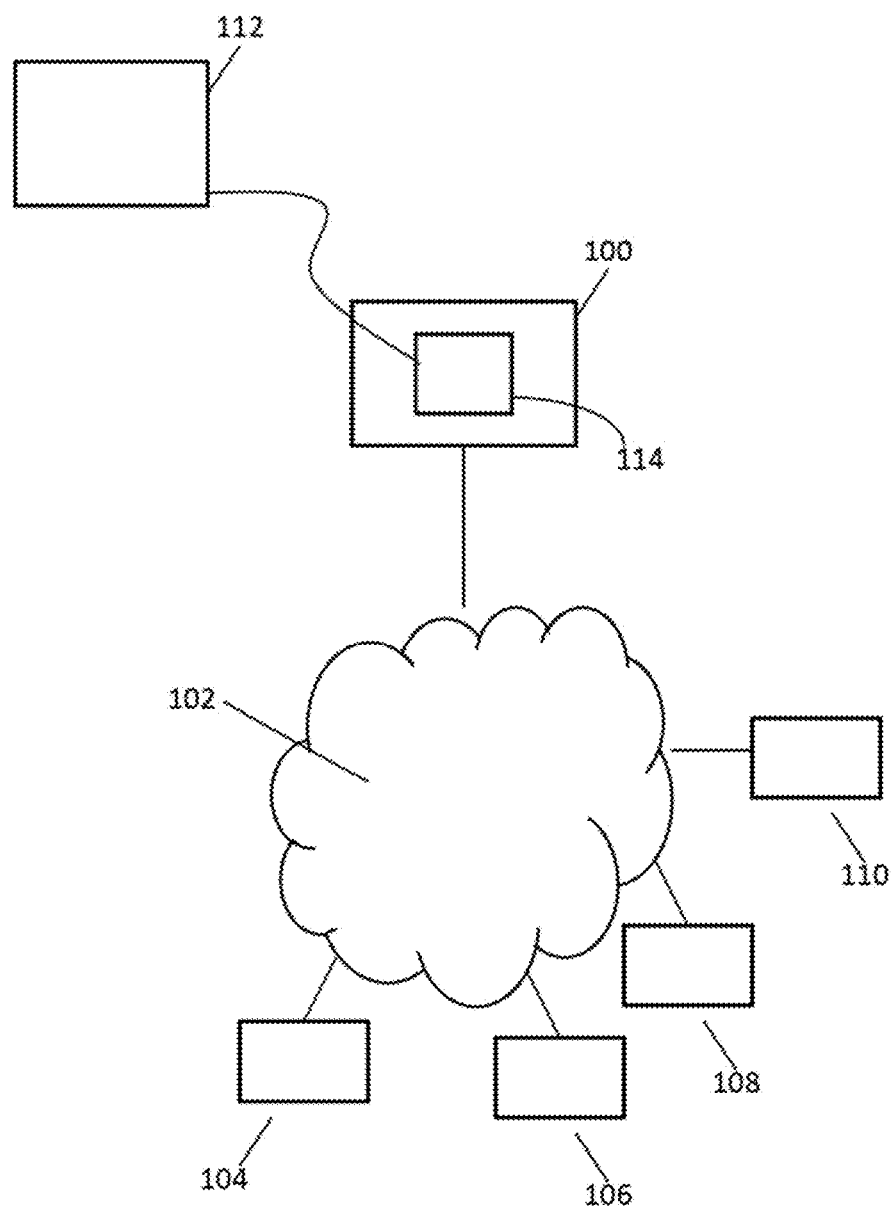
FIG. 18 illustrates one possible configuration of a computer network for implementing the method of the disclosed embodiments.

Based on the establishment of Record Date Cohorts as outlined above (that is, the date of record for one or more Cohorts, such as Cohort A, B, etc), the system executes the following steps in the following sequence, though alternate sequences are acceptable if they produce substantially similar results relating to accurate returns and share counts. These steps mathematically describe the steps illustrated in FIGS. 3-6, described above, and, as an example, step 5D of making positive and negative adjustments to assets based on purchase creations and redemptions, and are further applied as illustrated in FIGS. 15, 15A and 15B, and the related disclosure, provided below. For the purposes of the system process and related calculations (below), individual holdings underlying a Record Date Cohort are treated as one homogeneous group.

The steps disclosed herein apply to both intra-period (e.g., during a trading day) processing and to post-period (e.g., end of trading day) processing. Post-period processing may result in share count changes, while no share count changes due to system processing will occur during a market period. However, the system applies pro-form a share changes during the course of a market period for the purpose of computing intra-period prices. Creations and redemptions of shares during a market period are contemplated and will appropriately alter the number of shares outstanding during a market period.

Notation used below to indicate Record Date Cohort system entries is:

Variable (c,t) where c indicates a particular cohort (e.g., A, B, or C) and t indicates a respective periods, such as a date or time, e.g., t(1), t(2), t(3). Additionally, for a given period (t), the variable in a formula identifying (c,t) will be (c) while (t) will be constant for the identified period (unless otherwise indicated).

First, the system calculates the return on the Fund Assets (element 14, FIG. 3) for the related period (the "Periodic Fund Return" or "PFR") (element 20, FIG. 3). The system calculates S1$a$ the Periodic Fund Return by applying the following formula:

$PFR_t$ or $PFR(t) = (Assets_t - Assets_{t-1})/Assets_{t-1}$ where:

(t) is the current period, (t−1) is the previous period, and "Assets" equals the asset value of the fund; it is noted that PFR is capable of changing on a pro forma, or intra-period basis.

As depicted in FIG. 3 and FIG. 12, for the processing in this step, the system determines the Periodic Fund Return, $Assets_t$; and $Assets_{t-1}$ the following way:

The Periodic Fund Return is determined by Polling Exogenous Variables, for example, by drawing market prices from outside (exogenous) sources, and applying such prices to the assets stored in its Periodic Fund Return Data (element 22, FIG. 3);

$Assets_t$ are calculated with live or closing prices; and $Assets_{t-1}$ are calculated with prices from the immediately preceding open or close.

Second, the system calculates the periodic cumulative fund return for each Record Date Cohort (the "Cumulative Fund Return" or "CFR"). The system calculates Cumulative Fund Return in essentially the following manner:

$$CFR_{c,t} = L \times \left[ -1 + \prod_{t=1}^{t=n} (1 + PFR(t)) \right]$$

each $CFR_{c,t}$ is a scalar indicating the aggregate return of such cohort since its inception, where:

the notation c,t indicates cohort (c) and period (t); a $CFR_{c,t}$ value exists for such Cohort (c) when a cohort has a non-zero invested amount;

(t) is the period which is the variable of the equation, advancing from the first to the current period, and there will be as many CFR values as there are cohorts existing in a given period; and L=indicates the leverage for the related fund (i.e. −1 for an inverse fund, and +2 for a 2-times leveraged fund).

According to the above formula, the system generates a Cumulative Fund Return value for each Record Date Cohort for any determination date or time (where a determination is made intra-period). The system tracks a Record Date Cohort for each trading day since the fund's launch. Further, in the event that a Record Date Cohort has triggered a threshold loss (see above), the CFR value will reset to zero consistent with any new record date investment or assignment.

Third, the system calculates the periodic cohort return for each Record Date Cohort (the "Periodic Cohort Return" or "PCR"). The system calculates the PCR in essentially the following manner:

$PCR_{c,t} = [(1+CFR_{c,t}) - (1+CFR_{c,t-1})]/(1+CFR_{c,t-1})$ where: (c) is the variable, advancing from Cohort A to the cohort existing in a given period (t).

According to the above formula, the system generates a PCR value for each Record Date Cohort for any determination date or time (where a determination is made intra-period). The system maintains a unique PCR value for each market date since the fund's inception.

Fourth, the system calculates the periodic cohort liquidation value (the "Cohort Liquidation Value" or "CLV"). The system calculates Cohort Liquidation Value in essentially the following manner:

$CLV_{c,t} = CLV_{c,t-1} \times (1+PCR_{c,t})$ where:

for a Record Date Cohort initial period, $CLV_{c,t-1}$ is the market value of newly acquired fund shares based on a purchase having occurred at either the market open or market close depending on system implementation.

According to the above formula, the system generates a Cohort Liquidation Value for each Record Date Cohort for any determination date or time. The system maintains a unique Cohort Liquidation Value for each market date since the fund's inception.

Fifth, the system calculates the periodic cohort liquidation value percentage (the "Cohort Liquidation Value Percentage" or "CLP"). The system calculates the Cohort Liquidation Percentage in essentially the following manner:

$$CLP_{c,t} = CLV_{c,t} \bigg/ \sum_{c=A}^{c=Z} CLV_{(c,t)}$$

where: (c) is the variable, advancing from the first cohort (Cohort A) to the last (Cohort Z) existing in a given period.

According to the above formula, the system calculates Cohort Liquidation Percentage for each Record Date Cohort for any determination date or determination time. The Cohort Liquidation Percentage for a Record Date Cohort equals that Record Date Cohort's percentage interest in the overall fund value.

Sixth, the system calculates the total calculated shares for the related determination date (the "Total Calculated Shares" or "TCS"). The total number of shares for any determination date, pro form a, i.e., intra period, and at the close of the date, will be equal to: (i) the number of new shares issued by the fund under a conventional share creation process or similar process, minus (ii) the number of shares previously issued by the fund and redeemed by the fund under a conventional share redemption process or similar process, plus, (iii) the total number of shares calculated by the system, based on the number of shares outstanding (and not redeemed) in the immediately preceding period. The system calculates Total Calculated. Shares in essentially the following manner:

$$TCS_t = \text{Maximum}(S_{c,t-1}/CLP_{c,t}) - RED_t + CRE_t$$

where:

(t) is constant for a given period and (c) is a variable, advancing from the first cohort (Cohort A) to the last cohort (Cohort Z) existing in a given period.

RED equals previously issued shares redeemed in the current period, which changes intra-period, impacting the price, intra-period; and CRE equals shares created in the current period, which also changes intra-period, impacting the price, intra-period.

That is, the system calculates the TCS for each determination, as the greatest value derived from dividing the immediately preceding "Share Count" or "S" (i.e., $S_{t-1}$) by the Cohort Liquidation Percentage values for each Record Date Cohort with a non-zero outstanding share amount for the current period, and adjusting for redemptions and creations.

Additionally, where beneficial interests are not conventional shares (including but not limited to implementations including notes or deposits) the effects of the increases in S for a Record Date Cohort may be implemented through a factor, such factor being a number equal to or greater than 100%. In the instance of a factor implementation, original share counts would be carried by the system in addition to the factor, and for all purposes of valuation, a Record Date Cohort would be measured by the product of its original share count and the factor. Such factor based implementation may be preferred in systems where explicit delivery of additional shares is administratively undesirable.

Moreover, in certain system implementations, the system utilizes a tolerance value in connection with the TCS step. In such an implementation, the system foregoes adjustments in the interest of transaction costs if the calculated TCS does not deviate materially from the existing share count.

Seventh, the system calculates the number of shares applicable to each Record Date Cohort (the "Share Count" or "S"). The system calculates Share Count in essentially the following manner:

$$S_{c,t} = \text{Maximum}(S_{c,t-1}, TCS_t \times CLP_{c,t})$$

where: (t) is constant for a given period and (c) is a variable, advancing from the first cohort (Cohort A) to the last cohort (Cohort Z) existing in a given period; S for a given Record Date Cohort on a determination date is the greater of S for the immediately preceding period and the product of $TCS_t$ and $CLP_{c,t}$.

That is, the system calculates a Share Count for each Record Date Cohort for any determination date or determination time. The Share Count for a Record Date Cohort equals the product of (x) the Record Date Cohort's percentage interest in the overall fund value ($CLP_t$), and (y) the Total Calculated Shares ($TCS_t$) calculated by the system, subject to a minimum value equal to the immediately preceding $S_{c,t}$.

Eighth, the system calculates the actual total number of shares for the related determination date or determination time (the Total Shares or "TS"). The system calculates TS in essentially the following manner:

$$TS_1 = \sum_{c=A}^{c=Z} S_{(c,t)}$$

where: (t) is constant for a given period and (c) is a variable, advancing from the first cohort (Cohort A) to the last cohort (Cohort Z) existing in a given period.

That is, the system calculates TS as the summation of Share Counts (S) of all Record Date Cohorts.

Ninth, the system calculates the price per share (the "Price" or "P"). The system calculates P in essentially the following manner:

$$P_t = NAV_t / TS_t$$

where NAV is the Net Asset Value, explained below.

That is, the system calculates a single share price applicable to all shares at each moment during a market period, and at the close of a market period.

Tenth, in the case of intra-period calculations and intra-period system processing, the system disseminates both the intra-period Net Asset Values and intra-period, Price to all related intermediaries, exchanges and other entities as required to facilitate a continuously tradable market in the shares. This dissemination is illustrated in FIG. 12. The fund, either directly or through an agent (e.g. transfer agent, registrar, custodian, or other service provider) will post values to an internet location of a specific customized computer file server where pricing services including exchanges, market makers, and other market participants can access and retrieve historical and live Prices and Net Asset Values; in certain implementations, live values will be electronically updated and posted several times a minute.

Eleventh, the system disseminates closing prices and NAVs to all related intermediaries, exchanges, and other entities involved in markets reporting in the case of closing period calculations and post-period close processing. Further, the system reports the revised share counts, if any, to the centralized settlement entity (e.g. the Depository Trust Company) and to related agent brokers and other intermediaries acting on behalf of fund investors. This reporting is illustrated in FIG. 12. Similarly to the tenth step, identified above, the fund, either directly or through an agent (e.g. transfer agent, registrar, custodian, or other service provider) will post values to an internet location of a specific customized computer file server where pricing services including exchanges, market makers, and other market participants can access and retrieve historical and live closing Prices, ending Net Asset Values, and adjusted share counts; in certain implementations, live values will be electronically updated and posted several times a minute.

The computers which implement the system processes will be required to determine the values associated with the above steps at the close of a market period, and on a near-instantaneous basis during a trading period—the acceptable frequencies for the system to process all of the above steps for a fund is essentially several times a minute, such as four times a minute. The computer system will perform all of the above listed steps continuously and near instantaneously during a trading day.

The settlement timing of share adjustments may vary in one implementation to another based on the related settlement systems for the applicable fund. Share adjustments may settle as soon as the business day immediately following the share count determination, or on a delayed basis.

Figure 13:
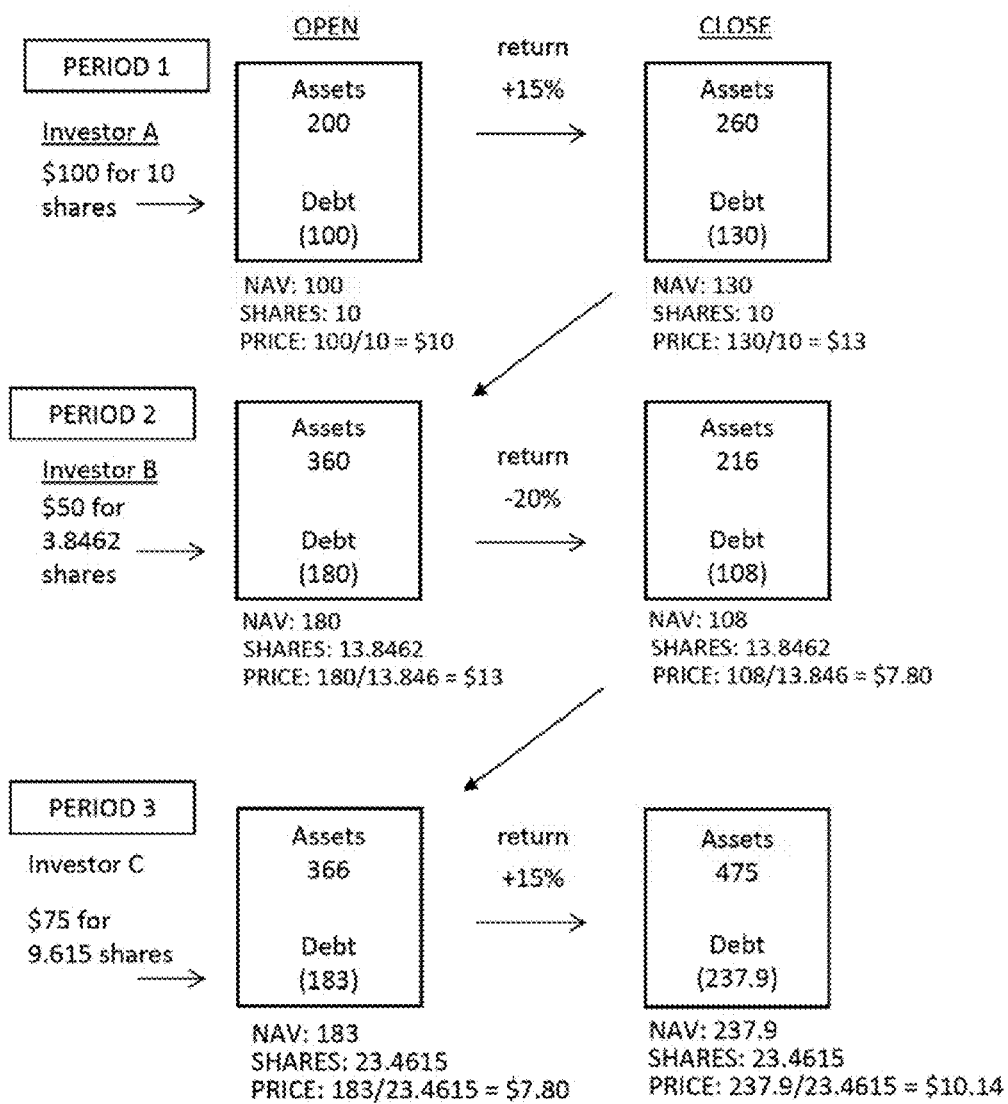
FIG. 13 is a diagram illustrating the investor returns and outcomes based on typical industry methodology (existing ETFs)

FIGS. 13 and 14 will now be reviewed. FIG. 13 and FIG. 14 illustrate the typical industry methodology using the return sequence and investor entries from FIG. 7 above; investors enter in 3 sequential periods with investment amounts of $100, $50, and $75 respectively, and the three period return sequence is +15%, −20%, and +15%. FIGS. 15 and 16 apply the disclosed embodiment to the same return sequence and same investor entry points. The targeted fund return for FIG. 13 through FIG. 16 is a 2-times leveraged fund.

Beginning with FIG. 13, the figure is a diagram illustrating the investor returns and outcomes based on the typical industry methodology (existing ETFs). In FIG. 13, three distinct cohorts invest at the beginning of periods 1, 2, and 3 with investments amounts of $100, $50, and $75 respectively. The fund manages its assets and shares counts consistent with existing practices. As illustrated, the periodic returns for periods 1, 2, and 3 are +15%, −20%, and +15% respectively. The left column indicates Assets/Debt at each period opening. The right column indicates Assets/Debt at each period closing (after giving effect to the periodic return).

That is, in FIG. 13, each of the three rows is a period, and the left column indicates a period open and the right column indicates a period close after giving effect to the periodic return.

(FIG. 13 Period One—Applying the Typical Industry Methodology)

Starting from top and left, investor A (Record Date Cohort A) enters the fund where the initial Price at Period 1 Opening is $10/share. With an initial investment of $100, investor A therefore obtains 10 shares. Because the fund is targeted to deliver 2-times the index return, the fund acquires the equivalent of $200 of assets, and the fund incurs the equivalent of $100 of debt ((initial) Period 1 opening assets−(initial) Period 1 opening capital). The initial Net Asset Value ("NAV") will be equal to assets ($200) minus debt ($100) or $100.

Moving to the Period 1 Close, the assets have gained or returned 15%, or $30 (15%×200). The constant leverage of the typical industry methodology, however, causes the fund to also lever the gain 2 times. Assets and debt will be equal to the following equations:

$$Assets_t = Assets_{t-1} \times (1+2 \times R_t) = 200 \times (1+30\%) = 260; \quad R = \text{the}$$

actual return rate and the multiple of "2" is the leverage of the fund.

$$Debt_t = Debt_{t-1} + Assets_{t-1} \times R_t = 100 + 200 \times 0.15 = 130.$$

Thus, Assets equal 5260 and Debt equals $130. Net Asset Value is again Assets minus debt or $130. The price per share at Period 1 Close is NAV/shares outstanding or 130/10=$13 per share.

FIG. 13 (Period Two—Applying The Typical Industry Methodology)

Investor B (Record Date Cohort B) enters the fund with a $50 investment. With shares at $13 per share from Period 1 close, Investor B obtains $50/$13 per share=3.8462 shares. As a result, the number of shares sold by the fund so far (both periods) is 13.8462 shares.

Because the fund is targeted to deliver 2-times the index return, the fund will acquire the equivalent of $50×2 or $100 of new assets at Period 2 opening. With assets at Period 2 closing being $260, the total assets of the fund are $260+$100=$360. In addition, the fund will incur the equivalent of $50 of new debt (incremental assets−incremental capital, corresponding with the total actual investment at Period 2 opening by Investor B). With the Period 1 close debt being $130, the total debt of the fund at Period 2 opening is $130+$50=$180.

The Period 2 opening Net Asset Value (NAV) will be equal to Period 2 opening assets minus Period 2 opening debt or $360−$180=$180. This amount is also equal to the Period 1 closing NAV plus Period 2 opening investment (incremental capital) from investor B. The Period 2 opening price per share is Period 2 opening NAV/shares outstanding=180/13.8462=13

Moving to the Period 2 Close, the assets have lost 20% (−20% return), which amounts to −20%×360=$72. The constant leverage of the typical industry methodology, however, causes the fund to also de-lever the loss 2 times, or −2×$72=−$144. Assets and debt will be equal to the following equations:

$$Assets_t = Assets_{t-1} \times (1+2 \times R_t), \quad \text{or} \quad \$360 \times (1+2 \times -20\%) = \$360 - \$144 = 216$$

$$Debt_t = Debt_{t-1} + Assets_{t-1} \times R_t, \text{ or } 180 - 360 \times -20\% = \$180 - \$72 = \$108$$

Thus, assets equal $216 and debt equals $108. Net Asset Value is assets minus debt for Period 2 close, or $108. The price per share is NAV/shares outstanding at Period 2 close, or $108/13.8462=$7.80.

FIG. 13 (Period Three—Applying The Typical Industry Methodology)

Investor C (Record Date Cohort C) enters the fund with a $75 investment, at the $7.80 Period 2 close price per share, to obtain $75/$7.80=9.615 shares. The Period 3 opening outstanding shares=13.8462+9.615=23.4615 shares.

Because the fund is targeted to deliver 2-times the index return, the fund at Period 3 opening acquires the equivalent of $75×2 or $150 of new assets, so that Period 3 opening assets $216+$150=$366. In addition, the fund incurs at Period 3 opening the equivalent of $75 of new debt (incremental assets−incremental capital, corresponding with the total actual investment by Investor C) so that Period 3 opening debt of $108+$75=$183. Thus, Period 3 opening assets equal $366 and Period 3 opening debt equals $183.

The Period 3 opening (initial) net asset value (NAV) equals Period 3 opening Assets ($366) minus Period 3 opening Debt ($183) or $183.

Moving to the Period 3 Close, the assets have gained 15% or +15%×366=$54.90. The constant leverage of the typical industry methodology, causes the fund to also lever the gain 2 times; or 2×54.90=(approx) $109. That is, Period 3 close assets and Period 3 close debt equal the following equations:

$$Assets_t = Assets_{t-1} \times (1+2 \times R_t), \text{ or } 366 \times (1+2 \times 15\%) = 366 + 109 = \$475.8$$

$$Debt_t = Debt_{t-1} + Assets_{t-1} \times R_t, \text{ or } 183 + 366 \times 15\% = 237.9$$

Thus, Period 3 close assets equal $475 and Period 3 close debt equals $237.9. Period 3 close NAV is Period 3 close assets minus Period 3 close debt or $237.9, and the Period 3 close price per share is Period 3 close NAV/outstanding shares=$237.9/23.4615=$10.14.

FIG. 14 is tabular representation of the results from FIG. 13 indicating both the shares and values attributable to each Record Date Cohort at each period of the illustration. Within the table, the results are indicated as "X/Y," where "X" is the related value at the beginning of the period, and "Y" is the related value at the end of the period after giving effect to the periodic return. The algebraic analysis below the table, discussed below, illustrates the targeted return, realized return, and accuracy of the realized return for each Record Date Cohort.

That is, FIG. 14 is a Record Date Cohort table which summarizes the investor results in the FIG. 13 illustration. The table in FIG. 14 has Record Date Cohorts A through C across the columns and the rows indicate periods 1 through 3; in each row, "Shares" indicates share count, "Value" indicates market value or liquidation entitlement (or Cohort Liquidation. Value) and the values are presented as "X/Y", where "X" is the opening period value, and "Y" is the closing period value. It can be noted that the share count for each cohort does not vary from period to period and that the Value rises with gain periods (periods 1 and 3) and falls with a loss period (period 2). The closing value or holding period value of each Record Date Cohort can be found in the last row.

Specifically, for Cohort A, for each period (i.e., Periods 1-3), the opening and closing number of shares remains a constant 10. For Cohort B, for each period (i.e., Periods 2 and 3), the opening and closing number of shares remains a constant 3.8462. For Cohort C, for each period (i.e., Periods 3), the opening and closing number of shares remains a constant 9.615

For Cohort A, for Period 1, the opening and closing values for the all shares owned by this Cohort is 100 and 130 (listed as 100/130). For Period 2, the opening and closing values for the all shares owned by Cohort A is 130 and 78. For Period 3, the opening and closing values for the all shares owned by Cohort A is 78 and 101.40.

For Cohort B, for Period 2, the opening and closing values for the all shares owned by this Cohort is 50 and 30. For Period 3, the opening and closing values for the all shares owned by Cohort B is 30 and 39. Finally, for Cohort C, for Period 3, the opening and closing values for the all shares owned by this Cohort is 75 and 97.5. In sum, the closing value or holding period value of each Record Date Cohort is 101.40, 39, and 97.5 for Record Date Cohorts A, B, and C respectively.

The values in FIG. 14 can be used to assess the accuracy of the typical industry methodology for each Record Date Cohort.

For Record Date Cohort A, the targeted return and realized returns are as follows:

Targeted: leverage×[−1+(1+Period 1 return)×(1+Period 2 return)×(1+Period 3 return)]=2×[−1+(1+15%)×(1−20%)×(1+15%)]=11.6%

Realized Percent Return: (Period 3 return−Initial Investment at Period 1 opening)/initial investment=(101.4−100)/100=1.4%

For Record Date Cohort A, the typical industry methodology realized a 10.2% return shortfall or an 87.9% shortfall in percentage terms.

For Record Date Cohort B, the targeted return and realized returns are as follows:

Targeted: leverage×[−1+(1+Period 2 return)×(1+Period 3 return)]=2×[−1+(1−20%)(1+15%)]=−16%

Realized: Percent Return: (Period 3 return−Initial Investment at Period 2 opening)/100=(39−50)/50=−22%

For Record Date Cohort B, the typical industry methodology realized a 6% return shortfall or a 37.5% excess loss in percentage terms.

For Record Date Cohort C, the targeted return and realized returns are as follows:

Targeted: leverage×[−1+(1+Period 3 return)]=2×[−1+(1+15%)]=30%

Realized: (97.5−75)/75=Percent Return: (Period 3 return−Initial Investment at Period 3 opening)/100=−30%

For Record Date Cohort C, the typical industry methodology realized an accurate return with no error. This result conforms to the ProShares disclosure above where only the single day cohort realizes an accurate return.

FIG. 15 is a diagram illustrating the investor returns and outcomes based on the disclosed embodiment. The format of FIG. 15 is identical to that of FIG. 13. Below the diagram, the share count is indicated for each Record Date Cohort for the close of each period. FIG. 13 omits this period-by-period share count reporting, because share counts do not change in the typical industry methodology.

That is, FIG. 15 demonstrates the same cohort population and the same three periods return sequences as in FIG. 13 using the disclosed embodiment. On a summary comparison, the closing assets, debt and share counts differ because: (i) the disclosed embodiment does not require periodic gains to be leveraged or periodic losses to be de-leveraged, and (ii) the disclosed embodiment alters the share counts for the Record Date Cohorts based on the system process outlined above. FIG. 15 indicates the share counts for each Record Date Cohort for each period below the table.

Beginning with FIGS. 15, 15A and 15B, each of the three rows in FIG. 15 is a trading period. The left column indicates a period open and the right column indicates a period close after giving effect to the periodic return.

It is noted that the following steps in this illustration apply equations on a period by period basis. However, various of the equation factors, including PFR and TSC, change throughout a period. Accordingly, in an actual application, pro form a, or intra period applications of each of these steps is performed, several times per minute based on regulatory requirements, so as to properly valuate Cohort shares, both in price and in share totals. Accordingly, when an investor transacts during a period, pro form a values of the total shares and the price per share would be obtained through the period-wise continual application and replication of these steps.

FIG. 15 (Period One—Disclosed Embodiment)

The first step, Step S1, is receiving period orders and calculating shares to distribute based on price per share in the previous period close. Investor A (Record Date Cohort A) enters the fund at Period 1 open with a $100 investment. With Period 1 open price per share=$10, set by the fund, Investor A obtains $100/$10=10 shares.

In sum for Step S1: Cohort A has 10 shares, priced at $10 per share, and 10 shares are distributed by the fund.

The second step, Step S2, is calculating the Period 1 opening asset totals, debt total and NAV for the fund. Because the fund is targeted to deliver 2-times the index return, the fund will acquire at Period 1 open the equivalent of Period 1 investment×leverage=$100×2=$200 of new assets. The fund at Period 1 open incurs the equivalent of $100 of new debt (incremental, Period 1 open assets−incremental, Period 1 open capital, corresponding to the total actual investment by Investor A). Thus, total running assets equal Period 1 open assets=$200 and total running debt equals Period 1 open debt=$100.

Because the fund is targeted to deliver 2-times the index return (2× leverage), the fund acquires the equivalent of $100×2=$200 of Assets at Period 1 opening. The fund incurs the equivalent of $100 of debt (initial, Period 1 open assets−initial, Period 1 open capital). The initial, Period 1 open net asset value (NAV) will be equal to Period 1 open Assets ($200) minus Period 1 open Debt ($100) or $100.

The initial, Period 1 open Net Asset Value (NAV) equals to Period 1 open assets minus Period 1 open debt=$200−$100=$100.

In sum for Step S2: Period 1 open assets=$200; Period 1 open debt=$100; Period 1 open NAV=$100

The third step, Step S3, is tracking the Periodic Fund Return (PFRt) for the period, denoted as (t) in the $PFR_t$, as well as the change in assets. By Period 1 Close, $PFR_1$ is +15% due to the positive return for that period. Thus, by Period 1 Close, the assets have gained 15%, which, for the twice leveraged fund, is 15%×200=$30 gain in fund assets. The disclosed embodiment does not require leverage the gain. Accordingly, Period 1 close assets equal Period 1 open assets+Period 1 close asset gain=$200+$30=$230. Debt remains unchanged for a given period, after opening investments are accounted for. Thus, Period 1 close debt remains unchanged from the Period 1 open debt, which is $100. In addition, period 1 close NAV=Period 1 close assets−Period 1 close debt=$230−$100=$130

In sum for Step S3: $PFR_{1=15}$%; Period 1 close assets=$230; Period 1 close debt=$100; Period 1 close NAV=$130

In the disclosed embodiment the system next performs the fourth step, Step S4 of calculating for the end of the period, the total shares in the fund, the total shares in each Cohort, and the price per share. These values are based on the follow system steps. In addition, for all steps, unless otherwise indicated, when a period (t) is identified, the period close values are applied or calculated.

Step 4i: Calculate The "Cumulative Fund Return" ($CFR_{c,t}$) for each Cohort (c)

$$CFR_{c,t} = L \times \left[ -1 + \prod_{t=1}^{t=n} (1 + PFR(t)) \right].$$

For any period (t) or previous period, e.g., (t−1), which precedes the creation of Cohort (c), $CFR_{c,t}=CFR_{c,t-1}=0$.

$CFR_{A,1}=(L=2;PFR(1)=15\%)=2\times(-1+(1+15\%))=30\%$.

Note that with one Cohort and only one investment period, CFR is merely the leveraged return for the period.

Step 4ii: Calculate the Periodic Cohort Return ($PCR_{c,t}$) for each Cohort (c)

$PCR_{c,t}=[(1+CFR_{c,t})-(1+CFR_{c,t-1})]/(1+CFR_{c,t-1})$. For any period (t) or previous period, e.g., (t−1), which precedes the creation of Cohort (c), $PCR_{c,t}=PCR_{c,t-1}=0$.

$PCR_{A,1}=(CFR_{A,0}=0;CFR_{A,1}=30\%)=(1+30\%)-(1+0)/(1+0)=+30\%$

Note again that with one Cohort and only one investment period, PCR is also merely the leveraged return for the period.

Step 4iii Calculate the Cohort Liquidation Value ($CLV_{c,t}$) for each Cohort (c)

$CLV_{c,t}=CLV_{c,t-1}\times(1+PCR_{c,t})$. For any period (t−1) immediately preceding the creation of Cohort (c) $CLV_{c,t-1}$=actual investment by Investor (c). For any other prior period, e.g. (t−2), $CLV_{c,t-2}=0$ $CLV_{A,1}=(CLV_{A,0}=\$100;PCR_{A,1}=30\%)=100\times(1+30\%)=130$ Step 4iv: Calculate Cohort Liquidation Percentage ($CLP_{c,t}$) for each Cohort (c)

$$CLP_{c,t} = CLV_{c,t} \bigg/ \sum_{c=A}^{c=Z} CLV_{(c,t)}.$$

For any period (t) or previous period, e.g., (t−1), which precedes the creation of Cohort (c), $CLP_{c,t}=CLP_{c,t-1}=0$ $CLP_{A,1}=(CLV_{A,1}=130)=130/130=100\%$.

Note again that with one Cohort and only one investment period, the Cohort is capable of receiving 100% of the liquidation value for the fund.

Step 4v: Calculate "Total Calculated Shares" ($TCS_t$) for the entire fund $TCS_t$=Maximum($S_{c,t-1}/CLP_{c,t}$)−$RED_t$+$CRE_t$; For any period (t−1) immediately preceding the creation of Cohort (c) $S_{c,t-1}$=original shares in Cohort (c). For any other prior period, e.g. (t−2), $S_{c,t-2}=0$ $TCS_1=(S_{A,0}=10 \text{ shares};CLP_{A,1}=100\%)=\text{Max}(10/1)=\text{Max}(10)=10$.

Note again that with one Cohort and only one investment period, the single Cohort owns all of the total calculated shares for the fund.

Step 4vi: Calculate the Share Count ($S_{c,t}$) for each Cohort (c)

$S_{c,t}$=Maximum($S_{c,t-1}$, $TCS_t \times CLP_{c,t}$). For any period (t) or previous period, e.g., (t−1), which precedes the creation Of Cohort (c), $S_{c,t}=S_{c,t-1}=0$ $S_{A,1}=(TCS_1=10;CLP_{A,1}=100\%,)=10\times 1=10$.

Note again that with one cohort and only one investment period, the single cohort owns the counted shares for the fund.

Step 4vii: Calculate the Total Shares ($TS_t$) for the entire fund.

$$TS_t = \sum_{c=A}^{c=Z} S_{(c,t)}$$

$TS_1=(S_{A,1}=10)=10$

Note again that with one cohort and only one investment period, the single cohort owns the total shares for the fund.

Step 4viii: Calculate the Price ($P_t$) for the entire fund.

$P_t=NAV_t/TS_t$;

$P_1=(NAV_1=130;TS_1=10)=130/100=\$13$.

It is noted that since there is only one cohort in Period 1, Step S4 could have alternatively been performed as follows: Period 1 close NAV is Period 1 close assets ($230) minus Period 1 close debt ($100) or $130. Period 1 close price per share Period 1 close NAV/Period 1 close outstanding shares, or $130/10=$13 per share.

FIG. 15 (Period Two—Disclosed Embodiment)

The first step, Step S1, is receiving period orders and calculating shares to distribute based on price per share in the previous period close. Investor B (Record Date Cohort B) enters the fund at Period 2 open with a $50 investment. With Period 2 open price per share=Period 1 closing price=$13, Investor B obtains $50/$13=3.8462 shares.

In sum for Step S1: Cohort B consists of $50 invested at $13 per share=3.8462 shares The second step, Step S2, is calculating the new asset totals, debt total and NAV for the fund at the start of the period. Because the fund is targeted to deliver 2-times the index return, the fund will acquire at Period 2 open the equivalent of Period 2 investment×leverage=$50×2=$100 of new assets. The fund at Period 2 open incurs the equivalent of $50 of new debt (incremental, Period 2 open assets—incremental, Period 2 open capital, corresponding to the total actual investment by Investor B). Thus, total running assets equal Period 1 close assets+Period 2 open assets=$230+$100=$330 and total running debt equals Period 1 close debt+Period 2 open debt=$100+$50=$150.

The Period 2 open Net Asset Value (NAV) equals to Period 2 open assets minus Period 2 open debt=$330-$150=$180. This amount also equals the immediately preceding, Period 1 close NAV plus incremental Period 2 open capital from investor B of $50 provides $130+$50=$180.

In sum for Step S2: Period 2 open assets=$330; Period 2 open debt=$150; Period 2 open NAV=$180.

The third step, Step S3, is tracking the Periodic Fund Return ($PFR_t$) for the period as well as the change in assets and NAV. By Period 2 Close, $PFR_2$ is −20% due to the negative return for the period. That is, by Period 2 close, assets have lost 20%, corresponding to −20%×330=$66 loss in fund assets. Because the disclosed embodiment does not require a de-leveraging of the loss, the assets equal Period 2 open assets−Period 2 close asset loss=$330−$66=$264.

Debt remains unchanged for a given period, after opening investments are accounted for. Thus, debt remains unchanged from Period 2 open, at $150, because this is equivalent to the initial investments by Investor A and Investor B, which is fixed at $100 and $50, respectively. Thus, period 2 close NAV=Period 2 close assets−Period 2 close debt=$264−$150=$114

In sum for Step S3: $PFR_2$=−20%; Period 2 close assets=$264; Period 2 close debt=$150; Period 2 close NAV=$114.

In the disclosed embodiment the system next performs the fourth step, Step S4 of calculating for the end of the period, the total shares in the fund, the total shares in each Cohort, and the price per share. These values are based on the follow system steps. In addition, for all steps, unless otherwise indicated, when a period (t) is identified, the period close values are applied or calculated.

Step 4i: Calculate the Cumulative Fund Return ($CFR_{c,t}$) for each Cohort (c)

$$CFR_{c,t} = L \times \left[ -1 + \prod_{t=1}^{t=n}(1+PFR(t)) \right].$$

For any period (t) or previous period, e.g., (t−1), which precedes the creation of Cohort (c), $CFR_{c,t}=CFR_{c,t-1}=0$.

Step 4i: For Cohort A:

$CFR_{A,2}=(L=2;PFR(1)=15\%;PFR(2)=20\%)=2\times(-1+(1+15\%)\times(1-20\%))=-16\%$ Step 4i: For Cohort B. (created in Period 2):

$CFR=(L=2;PFR(2)=-20\%)=2\times(-1+(1-20\%))=-40\%$

Step 4ii: Calculate the Periodic Cohort Return ($PCR_{c,t}$) for each Cohort (c)
$PCR_{c,t}=[(1+CFR_{c,t})-(1+CFR_{c,t-1})]/(1+CFR_{c,t-1})$. For any period (t) or previous period, e.g., (t−1), which precedes the creation of Cohort (c), $PCR_{c,t}=PCR_{c,t-1}=0$.

Step 4ii: Cohort A:

$PCR_{A,2}(CFR_{A,1}=30\%;CFR_{A,2}=16\%)=[(1-16\%)-(1+30\%)]/(1+30\%)=-35.384\%$

Step 4ii: Cohort B (created in Period 2):

$PCR_{B,2}=(CFR_{B,1}=0;CFR_{B,2}=-40\%)=[(1-40\%)-(1+0)]/(1+0)=-40\%$

Step 4iii Calculate the Cohort Liquidation Value ($CLV_{c,t}$) for each Cohort (c)
$CLV_{c,t}=CLV_{c,t-1}\times(1+PCR_{c,t})$. For any period (t−1) immediately preceding the creation of Cohort (c)=actual investment by Investor (c). For any other prior period, e.g. (t−2), $CLV_{c,t-2}=0$ Step 4iii: Cohort A:

$CLV_{A,2}=(CLV_{A,1}=130;PCR_{A,2}=-35.384\%)=130\times(1-35.384\%)=84$

Step 4iii: Cohort B (created in Period 2):

$CLV_{B,2}=(CLV_{B,1}=\$50;PCR_{13,2}=-40\%)=50\times(1-40\%)=30$

Step 4iv: Calculate Cohort Liquidation Percentage ($CLP_{c,t}$) for each Cohort (c)

$$CLP_{c,t} = CLV_{c,t} \bigg/ \sum_{c=A}^{c=Z} CLV_{(c,t)}.$$

For any period (t) or previous period, e.g., (t−1), which precedes the creation of Cohort (c), $CLP_{c,t}=CLP_{c,t-1}=0$ Step 4iv: Cohort A $CLP_{A,2}=(CLV_{A,2}=84;CLV_{B,2}=30)=84/(84+30)=73.6842\%$ Step 4iv: Cohort B (created in Period 2)

$CLP_{B,2}=(CLV_{B,2}=30;CLV_{A,2}=84)=30/(84+30)=26.3158\%$

Step 4v: Calculate "Total Calculated Shares" ($TCS_t$) for the entire fund
$TCS_t=\text{Maximum}(S_{c,t-1}/CLP_{c,t})-RED_t+CRE_t$. For any period (t−1) immediately preceding the creation of Cohort (c) $S_{c,t-1}$=original shares in Cohort (c). For any other prior period, e.g. (t−2), $S_{c,t-2}=0$ $TCS_2=(S_{A,1}=10 \text{ and } CLP_{A,2}=73.6842\%;S_{B,1}=3.8462 \text{ and } CLP_{B,2}=26.3158\%)=\text{Max}(10/0.736842, 3.8462/0.263158)=\text{Max}(13.571,14.615)=14.615$ Step 4vi: Calculate the Share Count ($S_{c,t}$) for each Cohort (c)
$S_{c,t}=\text{Maximum}(S_{c,t-1},TCS_t\times CLP_{c,t})$. For any period (t) or previous period, e.g., (t−1) which precedes the creation of cohort (c), $S_{c,t}=S_{c,t-1}=0$
Step 4vi: Cohort A $S_{A,2}=(S_{A,1}=10;TCS_2=14.6155;CLP_{A,2}=73.6842\%)=\text{Max}(10,14.6155\times 0.736842)=\text{Max}(10,10.769)=10.769$ Step 4vi: Cohort B (created in Period 2)

$S_{B,2}=(S_{B,1}=3.846;TCS_2=14.6155;CLP_{B,2}=26.3158\%)=\text{Max}(3.846;14.6155\times 0.263158)=\text{Max}(3.846,3.846)=3.846.$ Note that the shares owned by Investor B did not change during its first cycle of trading.

Step 4vi: Calculate the Total Shares ($TS_t$) for the entire fund.

$$TS_t = \sum_{c=A}^{c=Z} S_{(c,t)}$$

$TS_2=(S_{A,2}=10.769;S_{B,2}=3.846)=10.769+3.846=14.615$

The two variable concept, i.e., TCS and TS, is provided in case the system implementation defers an adjustment for a period because of immaterial change size or implementation specifics. In such a case, TCS is a placeholder for system calculations while the trading via the ETF is depicted as TS.

Under the disclosed embodiment, the share count for Record Date Cohort A at Period 2 close rises from 10 to 10.769. In addition, the total share count at Period 2 close rises from 13.846 to 14.615.

Step Calculate the Price ($P_t$) for the entire fund.

$$P_t = NAV_t / TS_t$$

$$P_2 = (NAV_2 = 114; TS_2 = 14.615) = \$114/14.615 = \$7.80.$$

Note, the price per share at the end of the second period is the same as the known methods, even though NAV is different and the number of shares outstanding is different at the end of Period 2 (or any subsequent period) as compared with the known methods.

FIG. 15 (Period Three—Disclosed Embodiment)

The first step, Step S1, is receiving period orders and calculating shares to distribute based on price per share in the previous period close. Investor C (Record Date Cohort C) enters the fund at Period 3 open with a $75 investment. With Period 3 open price per share=Period 2 closing price=$7.80, Investor C obtains $75/$7.80=9.615 shares.

In sum for Step S1: Cohort C consists of $75 invested at $7.80 per share=9.615 shares The second step, Step S2, is calculating the new asset totals, debt total and net asset value (NAV) for the fund at the start of the period. Because the fund is targeted to deliver 2-times the index return, the fund will acquire at Period 3 open the equivalent of Period 3 investment×leverage=$75×2 or $150 of new assets. The fund at Period 3 open incurs the equivalent of $75 of new debt (incremental, Period 3 open assets−incremental, Period 3 open capital, corresponding to the total actual investment by Investor C). Thus, total running assets equal Period 2 close assets+Period 3 open assets=$264+$150=$414 and total running debt equals Period 2 close debt+Period 3 open debt=$150+$75=$225.

The Period 3 NAV equals Period 3 opening assets minus Period 3 opening debt, or $414−$225=$189. This amount equals the immediately preceding, Period 2 close NAV value plus incremental capital from investor C, or $114+$75.

In sum for Step S3: Period 3 open assets=$414; Period 3 open debt=$225; Period 3 open NAV=$189

The third step, Step S3, is tracking the Periodic Fund Return ($PFR_t$) for the period as well as the change in assets and NAV. By Period 3 Close, $PFR_2$ is 15% due to the return for the period. That is, by Period 3 close, assets have gained 15%, corresponding to 15%×$414=$62.10 gain in fund assets. Because the disclosed embodiment does not require a de-leveraging of the gain, the assets equal Period 3 open assets+Period 3 close asset loss=$414+$62.10=$476.1.

Debt remains unchanged for a given period, after opening investments are accounted for. Thus, debt remains unchanged from Period 3 open, at $225, because this is equivalent to the initial investments by Investors A, B and C, which is fixed at $100, $50, and $75, respectively. Thus, period 3 close NAV=Period 3 close assets−Period 3 close debt=$476.1−$225=$251.10.

In sum for Step S3: $PFR_3$=15%; Period 3 close assets=$476.1; Period 2 close debt=$225; Period 2 close NAV=$251.10.

In the disclosed embodiment, the price per share at close of the identified period is based on the follow system steps:

In the disclosed embodiment the system next performs the fourth step, Step S4 of calculating for the end of the period, the total shares in the fund, the total shares in each Cohort, and the price per share. These values are based on the follow system steps. In addition, for all steps, unless otherwise indicated, when a period (t) is identified, the period close values are applied or calculated.

Step 4i: Calculate the Cumulative Fund Return ($CFR_{c,t}$) for each Cohort (c)

$$CFR_{c,t} = L \times \left[ -1 + \prod_{t=1}^{t=n} (1 + PFR(t)) \right].$$

For any Period (t) or previous period, e.g., (t−1), which precedes the creation of Cohort (c), $CFR_{c,t}=CFR_{c,t-1}=0$.

Step 4i: For Cohort A:

$CFR_{A,3}=(L=2; PFR(1)=15\%; PFR(2)=-20\%; PFR(3)=+15\%)=2\times(-1+(1+15\%)\times(1-20\%)\times(1+15\%))=+11.6\%$ Step 4i: For Cohort B (created in Period 2):

$CFR_{B,3}=(\text{with } L=2; PFR(2)=-20\%; PFR(3)=15\%)=2\times(-1+(1-20\%)\times(1+15\%))=-16\%$ Step 4i: For Cohort C (created in Period 3):

$CFR_{C,3}=(L=2; PFR(3)=15\%;)=2\times(-1+(1+15\%))=30\%$

Step 4ii: Calculate the Periodic Cohort Return ($PCR_{c,t}$) for each Cohort (t)

$PCR_{c,t}=[(1+CFR_{c,t})-(1+CFR_{c,t-1})]/(1+CFR_{c,t-1})$. For any Period (t) or previous period, e.g., (t−1), which precedes the creation of Cohort (c), $PCR_{c,t}=PCR_{c,t-1}=0$.

Step 4ii: Cohort A:
$PCR_{A,3}=(CFR_{A,2}=-16\%; CFR_{A,3}=11.6\%)=[(1+11.6\%)=(1-16\%)]/(1-16\%)=32.857\%$ Step 4ii: Cohort B (created in Period 2):

$PCR_{B,3}=(CFR_{B,2}=-40\%; CFR_{B,3}=-16\%)=[(1-16\%)-(1-40\%)]/(1-40\%)=40\%$

Step 4ii: Cohort C (created in Period 3):

$PCR_{C,3}=(CFR_{C,2}=0; CFR_{C,3}=30\%)=((1+30\%)-(1-0))/(1+0)=30\%$

Step 4iii: Calculate the Cohort Liquidation Value ($CLV_{c,t}$) for each Cohort (c)

$CLV_{c,t}=CLV_{c,t-1}+PCR_{c,t})$. For any Period (t−1) immediately preceding the creation of Cohort (c) $CLV_{c,t-1}=$actual investment by Investor (c). For any other prior period, e.g. (t−2), $CLV_{c,t-2}=0$ Step 4iii: Cohort A:

$CLV_{A,3}=(CLV_{A,2}=84; PCR_{A,3}=32.857\%)=84\times(1+32.857\%)=111.60$

Step 4iii: Cohort B (created in Period 2):

$CLV_{B,3}=(CLV_{B,2}=30; PCR_{B,3}=40\%)=30\times(1+40\%)=42$

Step 4iii: Cohort B (created in Period 3):

$CLV_{C,3}=(CLV_{C,2}=75; PCR_{C,3}=30\%)=75\times(1+30\%)=97.5$

Step 4iv: Calculate Cohort Liquidation Percentage ($CLP_{c,t}$) for each Cohort (c)

$$CLP_{c,t} = CLV_{c,t} \bigg/ \sum_{c=A}^{c=Z} CLV_{(c,t)}.$$

For any Period (t) or previous period, e.g., (t−1), which precedes the creation of Cohort (c), $CLP_{c,t}=CLP_{C,t-1}=0$ Step 4iv: Cohort A $CLP_{A,3}=(CLV_{A,3}=111.60;CLV_{B,3}=42;CLV_{C,3}=97.5)=$
111.60/(111.60+42+97.5)=44.444%

Step 4iv: Cohort B (created in Period 2)

$CLP_{B,3}=(CLV_{A,3}=111.60;CLV_{B,3}=42;CLV_{C,3}=97.5)=$
42/(111.60+42+97.5)=16.726%

Step 4iv: Cohort C (created in Period 3)

$CLP_{C,1}=CLP_{C,2}=0$ $CLP_{C,3}=(CLV_{A,3}=111.60;CLV_{B,3}=42;CLV_{C,3}=97.5)=$
97.5/(111.60+42+97.5)=38.829%

Step 4v: Calculate "Total Calculated Shares" ($TCS_t$) for the entire fund
$TCS_t=\text{Maximum}(S_{c,t-1}/CLP_{c,t})-RED_t+CRE_t$. For any Period (t−1) immediately preceding the creation of Cohort (c) $S_{c,t-1}=$original shares in Cohort (c). For any other prior period, e.g. (t−2), $S_{c,t-2}=0$ $TCS_3=(S_{A,2}=10.769;CLP_{A,3}=44.444\%;S_{B,2}=3.846;$
$CLP_{B,3}=16.726\%;S_{C,2}=9.615;CLP_{C,3}=$
38.829%)=Max(10.769/0.4444,3.846/0.16726,
9.615/0.38829)=24.763(rounded)

Step 4vi: Calculate the Share Count ($S_{c,t}$) for each Cohort (c)
$S_{c,t}=\text{Maximum}(S_{c,t-1},TCS_t\times CLP_{c,t})$. For any Period (t) or previous period, e.g., (t−1) which precedes the creation of Cohort (c), $S_{c,t}=S_{c,t-1}=0$ Step 4vi: Cohort A $S_{A,3}=(S_{A,2}=10.769;TCS_3=24.763;CLP_{A,3}=0.44444)=$
Max(10.769,24.763×0.44444)=Max(10.769,
11.006)=11.006

Step 4vi: Cohort B (created in Period 2)

$S_{B,3}=(S_{B,2}=3.846;TCS_3=24.763;CLP_{B,3}=0.16726)=$
Max(3.846,24.763×0.16726)=Max(3.846,
4.142)= 4.142

Step 4vi: Cohort C (created in Period 3)

$S_{C,3}=(S_{C,2}=9.615;TCS_3=24.763;CLP_{C,3}=0.38829)=$
Max(9.615,24.763×0.38829=Max(9.615,9.615)=
9.615.

Note that the shares owned by Investor C did not change during its first cycle of trading.

Step 4vii: Calculate the Total Shares ($TS_t$) for the entire fund.

$$TS_t = \sum_{c=A}^{c=Z} S_{(c,t)}$$

$TS_3=(S_{A,3}=11.006;S_{B,3}=4.142;S_{C,3}=9.615)=11.006+$
4.142+9.615=24.763

Under the disclosed embodiment, the share count for Record Date Cohort A rises from 10.769 to 11.006. The share count for Record Date Cohort B rises from 3.8462 to 4.142. The total share count rises from 24.2308 (at period 3 open) to 24.763 (at period 3 close).

Step 4viii: Calculate the Price ($P_s$) for the entire fund.

$P_t=NAV_t/TS_t;P_3=(NAV_3=\$251.1;TS_3=$
24.763)=\$251.1/24.763=\$10.14

Note, again, that the price per share at the end of the third period is the same as the known methods, even though NAV is different and the number of shares outstanding is different at the end of Period 3 (or any subsequent period) as compared with the known methods.

FIG. 16 is a tabular representation of the results from FIG. 15 in the same format as FIG. 14. That is, FIG. 16 is a Record Date Cohort table which summarizes the investor results in the FIG. 15 illustration. The table in FIG. 16 has Record Date Cohorts A through C across the columns and the rows indicate periods 1 through 3. In each row, "Shares" indicates share count, "Value" indicates market value or liquidation entitlement (Cohort Liquidation Value) and the values are presented as "X/Y", where X is the opening period value, and Y is the closing period value. It can be noted that the share count for each cohort varies from period to period and that the value rises with gain periods (periods 1 and 3) and falls with a loss period (period 2).

The closing value or holding period value of each Record Date Cohort can be found in the last row and is 111.6, 42, and 97.5 for Record Date Cohorts A, B, and C respectively. These values conform with the product of the ending share counts and the ending share price for each of Record Date Cohorts A, B, and C. That is, for Cohort A, having 11.005 shares at 10.14 per share, the closing value is $111.60. For Cohort B, having 4.142 shares, at 10.14 per share, the closing value is $42. For Cohort C, having 9.615 shares at 10.14 per share, the closing value is 97.5.

The values in FIG. 16 can be used to assess the accuracy of the disclosed embodiment for each Record Date Cohort.

For Record Date Cohort A, the targeted return and realized returns are as follows:

Targeted: leverage×[−1+(1+Period 1 return)×(1+Period 2 return)×(1+Period 3 return)]=2[−1+(1+15%)(1−20%)×(1+15%)]=11.6%

Realized: (Closing value−initial value)/initial value=
(111.6−100)/100=11.6%

For Record Date Cohort A, the disclosed embodiment realized the targeted return with no error.

For Record Date Cohort B, the targeted return and realized returns are as follows:

Targeted: leverage×[−1+(1+Period 2 return)×(1+Period 3 return)]=2×[−1+(1−20%)×(1+15%)]=−16%

Realized: (42−50)/50=−16%

For Record Date Cohort B, the disclosed embodiment realized the targeted return with no error.

For Record Date Cohort C, the targeted return and realized returns are as follows:

Targeted: leverage×[−1+(1+Period 3 return)]=2×[−1+(1+15%)]=30%

Realized: (97.5−75)/75=−30%

For Record Date Cohort C, the disclosed embodiment realized the targeted return with no error.

Comparing the typical industry methodology (FIG. 13 and FIG. 14) with the disclosed embodiment (FIG. 15 and FIG. 16), the typical industry methodology introduces large errors and generates successful tracking only for a one-period horizon. On the other hand, the disclosed embodiment produces accurate returns for each cohort regardless of holding period.

FIG. 17 is a set of four comparison graphs in the same format as FIG. 2, except that FIG. 17 includes the performance of the disclosed embodiment in addition to the returns presented in FIG. 2. In each graph, the there are three returns presented: (i) "Target," representing the return an investor should receive if the fund process introduces no error, (ii) "ETF 2.0," representing the returns generated by the disclosed embodiment, and (iii) "ETF," representing the return series of the typical industry methodology.

That is, FIG. 17 revisits the data in FIG. 1 and the return comparisons in FIG. 2. FIG. 17 is contrasted with FIG. 2 in that the disclosed embodiment is added to the graphical comparisons. As in FIG. 2, "Target" indicates the return an investor should receive (without fund created error) and can be indicated as below for a 2-times leveraged fund:

$$\text{Target Return}=2\times[-1+(1+R1)\times(1+R2)\times(1+R3)\times(1+R4)\times(1+R5)]$$

In FIG. 17, "ETF" is the typical industry methodology, and "ETF 2.0" is the disclosed embodiment. As indicated in the figure (and consistent with the illustrations in FIG. 13 through FIG. 16), the disclosed embodiment delivers the targeted return in all instances; 0.01% differences are rounded in the system output. The essentially 100% accuracy of the disclosed embodiment is contrasted with consistent underperformance and often very material return differences delivered by the typical industry methodology.

In sum, the disclosed system provides the following novel methodology over the standard industry method for electronically trading funds:

(i) adjusting share counts in an investment vehicle in response to asset returns to cause individual and aggregate holdings to deliver accurate returns;

(ii) tracking Record Date Cohorts for the purpose of causing share holdings in a structured investment vehicle to accurately track targeted returns over multiple periods;

(iii) aggregating investors into Record Date Cohorts and making system adjustments on a Record Date Cohort by Record Date Cohort basis;

(iv) maintaining assets amounts and balances of the investment vehicle in manner consistent with the invested amounts (or capital contributions) of all Record Date Cohorts and the related return sequences relating to such Record Date Cohorts since date of investment and any related determination date without constant leverage, re-leveraging gains, or de-leveraging losses;

(v) tracking the percentage interest in aggregate net asset value (NAV) attributable to each Record Date Cohort for the purpose of adjusting the aggregate share count upwards;

(vi) tracking the percentage interest in aggregate net asset value (NAV) attributable to each Record Date Cohort for the purpose of adjusting the aggregate share upwards and causing each Record Date Cohort to maintain a percentage of shares outstanding consistent with its percentage of aggregate NAV;

(vii) causing the shares of each Record Date Cohort to be equal to the percentage NAV times the aggregate number of shares, subject to the condition that the shares for any Record Date Cohort may not decrease based on such adjustment; and (vii) tracking Record Date Cohorts through a range of mechanics including secondary market trades reported through clearing systems, secondary trade reporting triggered through a universal share borrow system, and secondary trade reporting through investor or investor's agent reporting.

In other words, a process, running on a real-time computer system, has been disclosed of aligning returns of individual holders or aggregate record date cohorts of an investment vehicle to holding period returns of an applicable index or strategy through adjusting outstanding shares or units attributable to such individual holders or aggregate Cohorts.

In the disclosed process, based on investment vehicle returns, the process upwardly adjusts the aggregate number of investment vehicle shares or units such that the units or shares equal a minimum number of units or shares which can be attributed to individual share holders or aggregate record date cohorts in an amount to cause unit or share count holdings to be proportionally equivalent to liquidation entitlements.

As also disclosed, the minimum number of shares is greater than or equal to the number of units or shares immediately preceding the related adjustment.

In the disclosed process, based on an increase in unit or share counts effected, the process allocates and subsequent distributes any additional units or shares to individual holders or aggregate record date cohorts with unit or share percentage holdings at a lower percentage than their respective liquidation entitlement percentage, and distributes the additional shares in an amount to cause equivalent proportionality of units held and liquidation value for each individual holder or aggregate record date cohort.

It is to be understood that the above disclosed electronically managed and traded fund includes a fund managing and trading computer node 100 electronically connected to a fund managing and trading electronically connected network 102, which further includes a plurality of computer nodes 102-110 that receive orders for trading fund shares. That is, the Cohorts are created and shares therein are traded based on orders received a various computer nodes on a network 102 (such as a cellular network, LAN or WAN).

On the fund managing and trading computer node 100, fund managing and trading computer non-transitory fund managing and trading software 112 is stored on RAM 114. The fund managing and trading software 112 instructs the fund managing and trading computer node 100 to substantially continuously electronically communicate with the networked computer nodes 104-110 for tracking movements of the shares over a plurality of trading periods.

In addition, the fund managing and trading software 112 instructs the fund managing and trading computer node 100 to perform the above disclosed method of determining shares in the fund and pricing therefore pro form a and at the end of an identified trading period. That is, each of the above disclosed steps illustrated in FIG. 15 are performed on the fund managing and trading computer node 100 due to software instructions. Of course the trading nodes 100 could be cell phones, stand along laptops, or stations situated at predetermined facilities.

As indicated, the above calculations are performed and repeated intra period as well as at the end of the period at the frequency required by the Exchanges and the regulatory bodies, including FINRA. The intra period calculations, occurring at least several times a minute as mandated by government regulations, assure that an investor transacting at any trading node at point during a period transacts the proper amount of shares at the appropriate prices as reflected by the on-going trading events. The variables which fluctuate throughout a trading date include PFR as well as TCS due to the change in $RED_t$ and $CRE_t$ during a trading day. It should be apparent that such calculations could not be performed by hand as the extent of trading in a large scale fund exceeds the ability of any individual fund manager. With the extent of the effort required in the above steps, and with the trading occurring across a multitude of computer nodes, the matrices of calculations could quickly reach several thousand per minute, at least, in order to maintain the required accuracy.

The above disclosed embodiments are not intended to limit the scope of the invention but are examples thereof, notable elements of which are recited in the appended claims. In addition, references to ETFs, Exchange Traded Funds and references to ETF features are not meant to limit the implementation of the embodiment from notes, deposits, or funds including but not limited to mutual funds.

I claim:

1. A non-transitory computer-readable medium storing computer-executable program instructions which, when executed by a processor, perform a process running on a real-time computer system, for aligning returns of individual holders or aggregate record date cohorts of an investment vehicle to holding period returns of an applicable index or strategy, comprising instruction codes implemented by a computer for:

creating a number of shares or units at market prices during a market period;

adjusting said number of said shares or units attributable to said individual holders or said aggregate record date cohorts while maintaining assets in amounts consistent with aggregate invested amounts, wherein, said aggregate record date cohorts is an aggregation of said shares or said units by a date of creation or a date of acquisition;

said adjusting upwardly adjusts said number of said shares or units based on investment vehicle returns, such that said number of said shares or units equals a minimum amount of said shares or units which can be attributed to said individual holders or said aggregate record date cohorts in a proportion to cause said number of said shares or units to be equivalent to liquidation entitlements; and wherein, said upwardly adjusting said number of said shares or units occurs continuously on a pro-form a real-time basis for trading, and said upwardly adjusting shares or units occurs at the close of a market period.

2. The non-transitory computer-readable medium of claim 1, wherein the minimum amount of said shares or units is greater than or equal to said number of said shares or units immediately preceding a related adjustment.

3. The non-transitory computer-readable medium of claim 1, further including computer-executable program instructions for:

allocating and subsequently distributing, based on an increase in unit or share counts effected, any additional units or shares to said individual holders or said aggregate record date cohorts with unit or share percentage holdings at a lower percentage than their respective liquidation entitlement percentage, and distributing the additional units or shares in an amount to cause equivalent proportionality of units or shares held and liquidation value for each said individual holder or said aggregate record date cohort.

4. The non-transitory computer-readable medium of claim 3, further including computer-executable program instructions for:

capturing and processing endogenous inputs including unit or share creations and redemptions and exogenous inputs including unit or share secondary market transactions, for the purpose of continuously creating, modifying and tracking groups or said aggregate record date cohorts with shared acquisition dates, and aggregating each such cohort or group with respect to said number of said shares or units and liquidation entitlements, and treating said aggregate record date cohort or group as a homogeneous interest for continued processed and valuating of share totals and prices.

\* \* \* \* \*